US009609068B2

(12) United States Patent
Michimura et al.

(10) Patent No.: US 9,609,068 B2
(45) Date of Patent: Mar. 28, 2017

(54) SESSION MANAGEMENT SYSTEM, SESSION MANAGEMENT APPARATUS, AND NON-TRANSITORY COMPUTER READABLE MEDIUM

(71) Applicant: FUJI XEROX CO., LTD., Tokyo (JP)

(72) Inventors: Tadao Michimura, Yokohama (JP); Masao Morita, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 214 days.

(21) Appl. No.: 14/462,042

(22) Filed: Aug. 18, 2014

(65) Prior Publication Data
US 2015/0172389 A1    Jun. 18, 2015

(30) Foreign Application Priority Data

Dec. 16, 2013  (JP) ................................. 2013-259060
Dec. 24, 2013  (JP) ................................. 2013-265262
Dec. 24, 2013  (JP) ................................. 2013-265263

(51) Int. Cl.
*H04L 29/08*     (2006.01)
*H04L 29/06*     (2006.01)

(52) U.S. Cl.
CPC ............ *H04L 67/142* (2013.01); *H04L 63/08* (2013.01)

(58) Field of Classification Search
CPC ............................... H04L 67/142; H04L 63/08
(Continued)

(56) References Cited

U.S. PATENT DOCUMENTS 6,446,116 B1 *  9/2002  Burridge ............... G06Q 10/10
                                                 345/15
6,473,802 B2   10/2002  Masters
                        (Continued)

FOREIGN PATENT DOCUMENTS

JP     2000-163369 A     6/2000
JP     2000-222353 A     8/2000
                        (Continued)

OTHER PUBLICATIONS

Jan. 10, 2017 Office Action issued in Japanese Patent Application No. 2013-265263.
(Continued)

*Primary Examiner* — Backhean Tiv
(74) *Attorney, Agent, or Firm* — Oliff PLC

(57) ABSTRACT

A response transmission unit transmits a response including unique information unique to a user who is authenticated on the basis of user identification information, to a session management server, in a case where the user identification information is included in a request received by a reception unit. A transmission unit transmits the response to a client apparatus along with identification information of a service providing server which is a transmission source of the response when the response with the unique information is received. A request transmission unit, in principle, transmits a request received by a request reception unit to a service providing server corresponding to identification information in the request, but transmits a request to a service providing server corresponding to identification information associated with unique information when receiving the request including the same unique information as unique information which has been stored in a session management DB.

4 Claims, 35 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 7,225,249 | B1* | 5/2007 | Barry | G06F 17/3089 709/227 |
| 7,509,424 | B2 | 3/2009 | Okazaki | |
| 2002/0040400 | A1* | 4/2002 | Masters | H04L 67/1008 709/228 |
| 2004/0083292 | A1* | 4/2004 | Lueckhoff | H04L 69/329 709/227 |
| 2004/0187036 | A1* | 9/2004 | Nakamura | G06F 21/6218 726/7 |
| 2005/0216421 | A1* | 9/2005 | Barry | G06F 11/0709 705/64 |
| 2006/0031377 | A1* | 2/2006 | Ng | G06F 17/30899 709/208 |
| 2007/0022199 | A1* | 1/2007 | Tatsubori | H04L 67/2804 709/227 |
| 2007/0136434 | A1* | 6/2007 | Mihira | H04L 67/1008 709/213 |
| 2007/0157304 | A1* | 7/2007 | Logan | H04L 67/02 726/12 |
| 2007/0169185 | A1* | 7/2007 | Readshaw | H04L 63/0281 726/12 |
| 2007/0192492 | A1 | 8/2007 | Okazaki | |
| 2008/0147870 | A1 | 6/2008 | Tomono | |
| 2008/0177883 | A1* | 7/2008 | Hanai | H04L 67/142 709/227 |
| 2009/0049180 | A1* | 2/2009 | El | H04L 67/14 709/227 |
| 2009/0300182 | A1* | 12/2009 | Ueno | H04L 67/24 709/226 |
| 2011/0026403 | A1* | 2/2011 | Shao | H04L 67/2895 370/235 |
| 2014/0089387 | A1* | 3/2014 | Chapman | H04L 29/0619 709/203 |
| 2014/0122574 | A1* | 5/2014 | Lee | H04L 67/42 709/203 |
| 2015/0006622 | A1* | 1/2015 | Lim | H04L 67/02 709/203 |
| 2015/0172389 | A1* | 6/2015 | Michimura | H04L 63/08 709/223 |
| 2015/0288671 | A1* | 10/2015 | Chan | H04L 63/0227 726/1 |
| 2015/0373148 | A1* | 12/2015 | He | H04L 67/34 709/203 |

FOREIGN PATENT DOCUMENTS

| | | |
|---|---|---|
| JP | 2009-169614 A | 7/2009 |
| JP | 2011-197796 A | 10/2011 |

OTHER PUBLICATIONS

Feb. 7, 2017 Office Action issued in Japanese Patent Application No. 2013-259060.

* cited by examiner

FIG. 4A http://www.example.com/serv

User Name: doe@example.co.jp
Password: *******

[LOG-IN] [CANCEL]

FIG. 4B http://www.example.com/serv

Image Translation Service [EXECUTE] [HELP]
Image Capture: Scan and Translate ▽
Translation Language: Japanese ▽
Output Form: pdf with Transparent Text ▽
Output Destination: mailto:doe@ex.co.jp

FIG. 4C http://www.example.com/serv

Image Translation Service [RETURN] [HELP]

Log in and scan document in close scanner

FIG. 4D http://www.example.com/serv

Image Translation Service [LOG-OFF] [CANCEL]

Scan document and start translation
[SCAN]

FIG. 14A http://www.example.com/serv

User Name: doe@example.co.jp
Password: *******

[LOG-IN] [CANCEL]

FIG. 14B http://www.example.com/serv

Image Translation Service [EXECUTE] [HELP]

Image Capture: Scan and Translate ▽
Translation Language: Japanese ▽
Output Form: pdf with Transparent Text ▽
Output Destination: mailto:doe@ex.co.jp

FIG. 14C http://www.example.com/serv

Image Translation Service [RETURN] [HELP]

Log in and scan document in close scanner

FIG. 14D http://www.example.com/serv

Image Translation Service [LOG-OFF] [CANCEL]

Scan document and start translation

[SCAN]

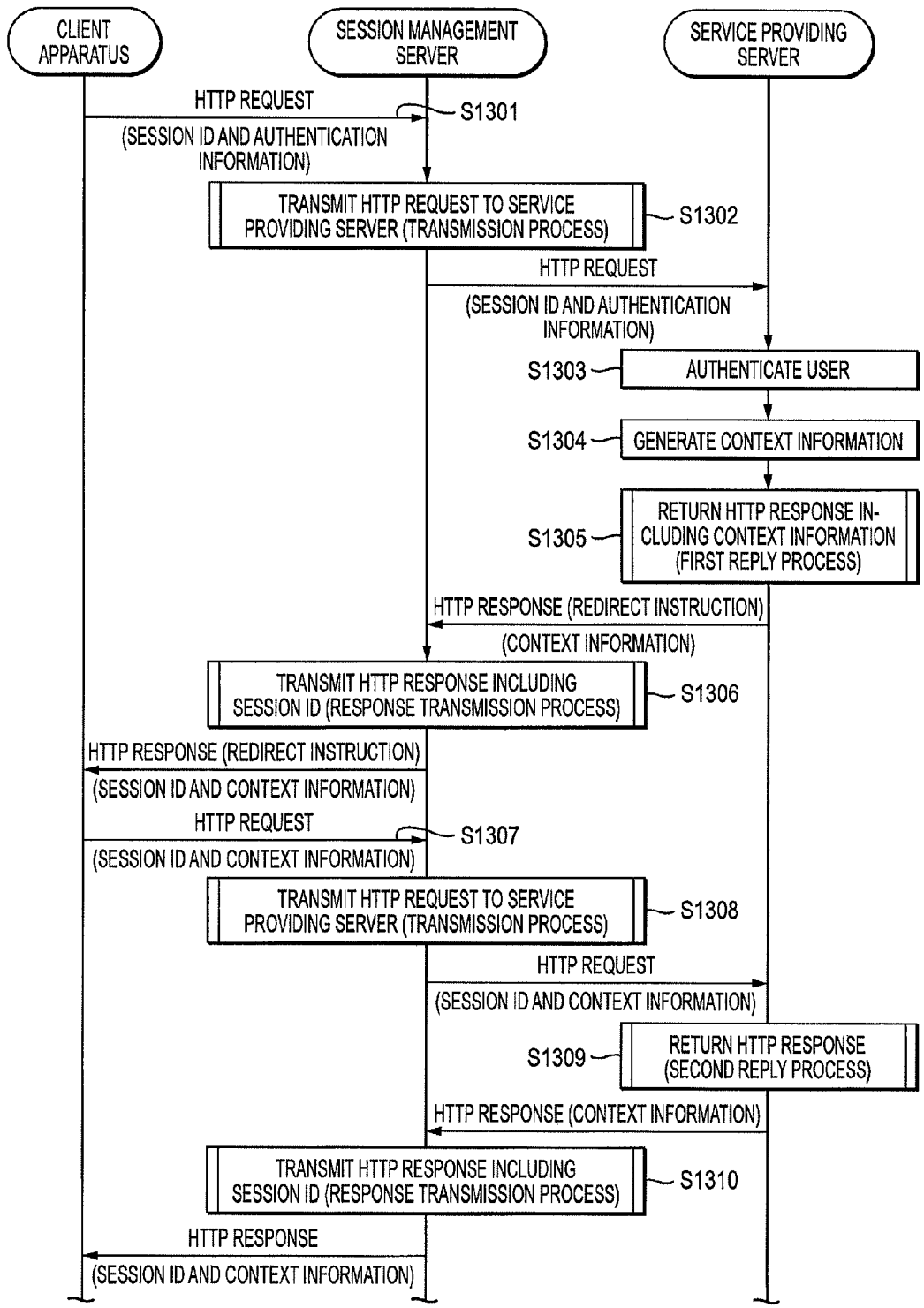

FIG. 24A http://www.example.com/serv

User Name: doe@example.co.jp
Password: *******

[LOG-IN] [CANCEL]

FIG. 24B http://www.example.com/serv

Image Translation Service [EXECUTE] [HELP]

Image Capture: Scan and Translate ▽
Translation Language: Japanese ▽
Output Form: pdf with Transparent Text ▽
Output Destination: mailto:doe@ex.co.jp

FIG. 24C http://www.example.com/serv

Image Translation Service [RETURN] [HELP]

Log in and scan document in close scanner

FIG. 24D http://www.example.com/serv

Image Translation Service [LOG-OFF] [CANCEL]

Scan document and start translation
[SCAN]

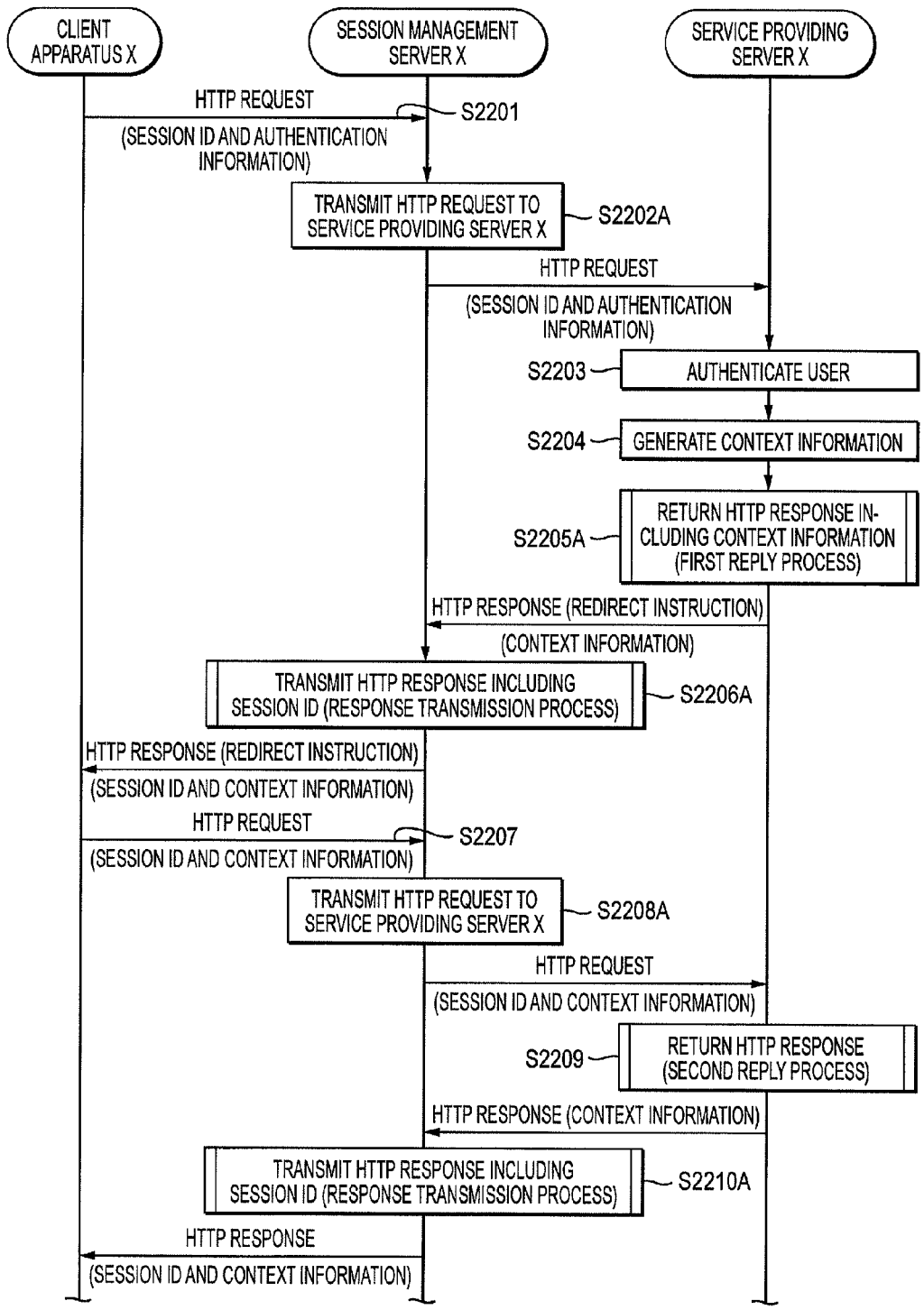

SESSION MANAGEMENT SYSTEM, SESSION MANAGEMENT APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-259060, filed on Dec. 16, 2013, Japanese Patent Application No. 2013-265262, filed on Dec. 24, 2013, and Japanese Patent Application No. 2013-265263, filed on Dec. 24, 2013.

BACKGROUND

Technical Field

The present invention relates to a session management system, a session management apparatus, and a non-transitory computer readable medium.

SUMMARY

According to an aspect of the present invention, it is a session management system comprising: a session management apparatus; and a plurality of service providing apparatuses that provide the same kind of service, in which the session management apparatus includes: a request reception unit that receives request data transmitted from a client apparatus; a request transmission unit that transmits the request data received by the request reception unit, to a service providing apparatus which is specified by session information in the request data; and a transmission unit that receives response data returned from the service providing apparatus which is a transmission destination of the request data after the request transmission unit transmits the request data, and that transmits the received response data to the client apparatus which is a transmission source of the request data along with session information for specifying the service providing apparatus which is a transmission destination, in which the service providing apparatus includes: a reception unit that receives request data transmitted from the session management apparatus; an authentication unit that authenticates a user identified by user identification information on the basis of the user identification information when the user identification information for identifying the user is included in the request data received by the reception unit; and a response transmission unit that transmits response data corresponding to the request data received by the reception unit, to the session management apparatus, and in which, when user identification information for identifying a user is included in request data received by the reception unit, the response transmission unit transmits response data corresponding to the request data to the session management apparatus along with user information unique to the user who is authenticated by the authentication unit on the basis of the user identification information, the session management apparatus further includes a storage unit that stores user information in association with session information, when user information is received from a service providing apparatus which is a transmission destination of request data along with response data after the request transmission unit transmits the request data, the transmission unit transmits the received response data to a client apparatus which is a transmission source of the request data along with session information for specifying the service providing apparatus which is a transmission destination and the received user information, in a case where, when user information is included in request data received by the request reception unit, and the same user information as the user information included in the request data is not stored in the storage unit, the request transmission unit stores the user information included in the request data in the storage unit in association with session information, and transmits the request data to a service providing apparatus specified by session information included in the request data, and in a case where, when user information is included in request data received by the request reception unit, and the same user information as the user information included in the request data is stored in the storage unit, the request transmission unit transmits the request data to a service providing apparatus specified by session information which is stored in the storage unit in association with the user information.

BRIEF DESCRIPTION OF THE DRAWINGS

Exemplary embodiment(s) of the present invention will be described in detail based on the following figures, wherein

FIG. 4A is a diagram illustrating a log-in screen;

FIG. 4B is a diagram illustrating a setting screen;

FIG. 4C is a diagram illustrating a guide screen;

FIG. 4D is a diagram illustrating an instruction standby screen;

FIG. 14A is a diagram illustrating a log-in screen;

FIG. 14B is a diagram illustrating a setting screen;

FIG. 14C is a diagram illustrating a guide screen;

FIG. 14D is a diagram illustrating an instruction standby screen;

FIG. 15 is a sequence diagram illustrating a process performed in the session management system;

FIG. 24A is a diagram illustrating a log-in screen;

FIG. 24B is a diagram illustrating a setting screen;

FIG. 24C is a diagram illustrating a guide screen;

FIG. 24D is a diagram illustrating an instruction standby screen;

FIG. 25 is a sequence diagram illustrating a process performed in the session management system;

DETAILED DESCRIPTION

Hereinafter, exemplary embodiments of the present invention will be described in detail with reference to the drawings.

Embodiment 1

Figure 1:
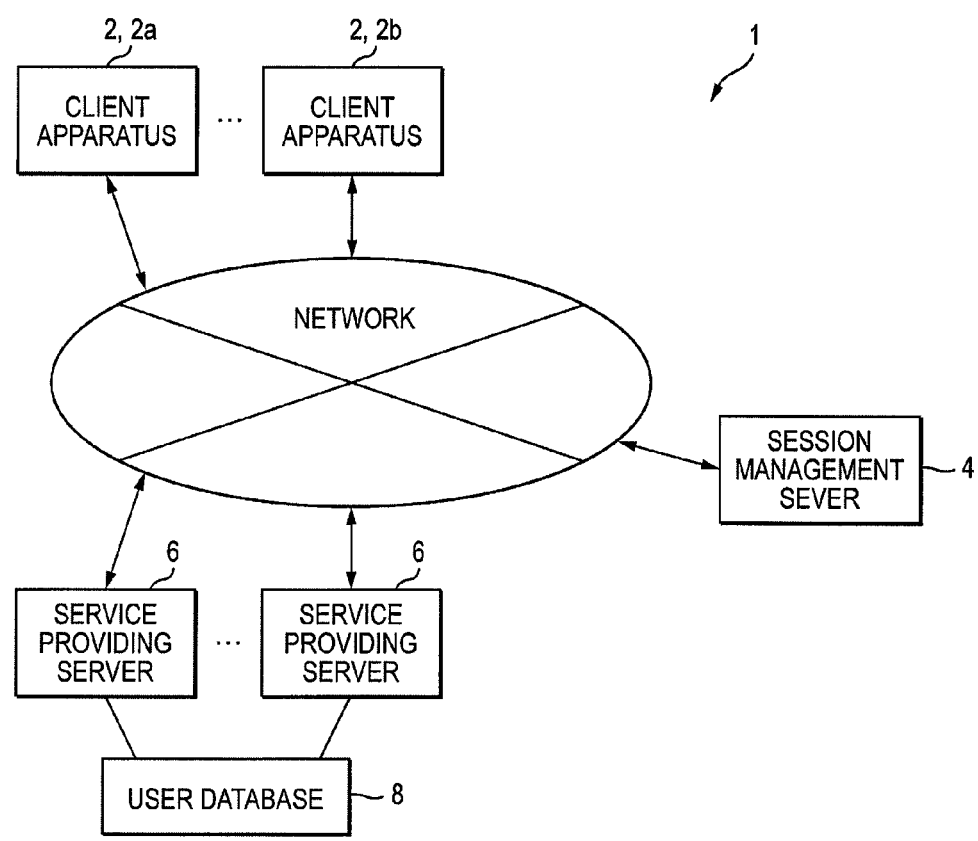
FIG. 1 is a diagram illustrating a configuration of a session management system according to Embodiment 1 of the present invention.

FIG. 1 is a diagram illustrating a configuration of a session management system 1 according to Embodiment 1 of the present invention. As illustrated in FIG. 1, the session management system 1 includes plural client apparatuses 2, a session management server 4, and plural service providing servers 6 which provide an information processing service. These apparatuses are connected to a network.

A browser application is installed in each of the client apparatuses 2, and a user logs in to an information processing service by using the browser application, so as to perform an HTTP session for using the information processing service. In Embodiment 1, a client apparatus 2a is realized by a personal computer which includes a microprocessor, a storage device such as a memory and a hard disk, an input device such as a mouse and a keyboard, a network interface, and a display. In addition, a client apparatus 2b is realized by an image processing system (a so-called multifunction machine) which includes a microprocessor, a storage device such as a memory and a hard disk, a network interface, a touch screen, and a scanner.

The session management server 4 and each of the service providing servers 6 are server computers which include a microprocessor, a storage device such as a memory and a hard disk, a network interface, and the like. The session management server 4 and the service providing server 6 respectively perform information processes according to programs stored in the storage devices. The programs may be received from the network so as to be stored in the storage devices, and may be read from a computer readable information storage medium so as to be stored in the storage devices. The session management server 4 is also referred to as a load balancer. In addition, the service providing servers 6 provide a common information processing service to a user on a cloud, and provide an image processing service of translating a document image transmitted from the client apparatus 2, to the user in Embodiment 1. Each service providing server 6 is connected to a user database 8. The user database 8 stores authentication information (a user name (user identification information) and a password) of a user who is registered as a user of a service, and the service providing server 6 performs user authentication by using the user database 8.

Figure 2:
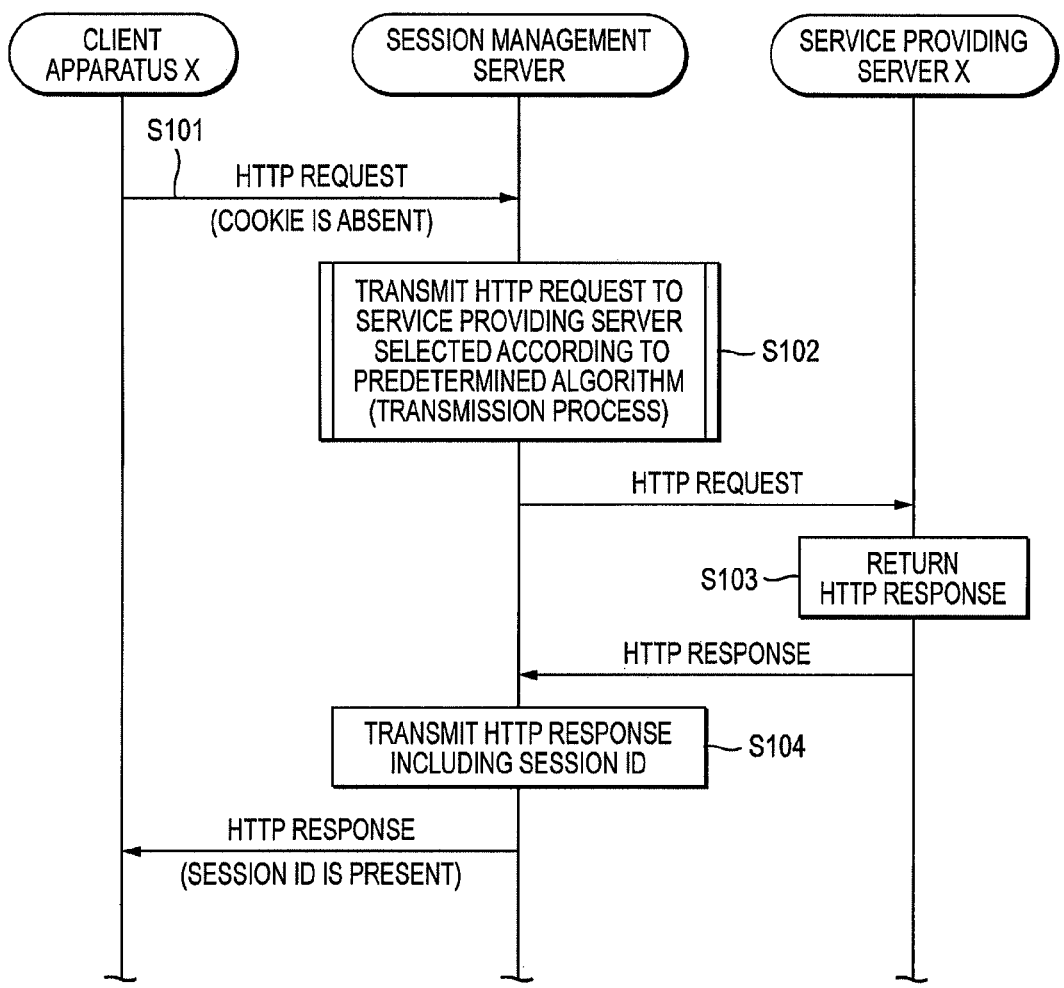
FIG. 2 is a sequence diagram illustrating a process performed in the session management system.

A description will be made of a case of using an image processing service. In Embodiment 1, a user activates a browser application in the client apparatus 2, and enters a uniform resource locator (URL) of a log-in screen at a predetermined location. FIG. 2 is a sequence diagram illustrating a process performed in the session management system 1 when the URL of the log-in screen is entered. Hereinafter, the client apparatus 2 in which the URL of the log-in screen is entered is referred to as a client apparatus X. When the user enters the URL of the log-in screen, the client apparatus X transmits an HTTP request (request data) to the session management server 4 by using the browser application (step S101). The HTTP request includes various data items such as cookie information held in the storage device of the client apparatus X. Here, since the client apparatus X does not hold cookie information, the cookie information is not included in the HTTP request.

The session management server 4 receives the HTTP request which is transmitted from the client apparatus X. In addition, the received HTTP request transmits the service providing server 6 which is selected according to a predetermined algorithm (for example, a round-robin algorithm) (S102). Specifically, the session management server 4 performs a transmission process illustrated in FIG. 3 when the HTTP request is received. In other words, the session management server 4 determines whether or not a session ID is included in cookie information of the HTTP request (S201). Here, the session ID is identification information of the service providing server 6.

As described above, in this step, there is no cookie information in the HTTP request. Therefore, the session management server 4 selects the service providing server 6 which is a transmission destination according to the above-described algorithm, and transmits the HTTP request to the selected service providing server 6 (S202). In addition, here, it is assumed that a service providing server X is selected.

The service providing server X which has received the HTTP request returns an HTTP response corresponding to the received HTTP request to the session management server 4 (S103). In this step, a web page of the log-in screen is returned as the HTTP response. In addition, the session management server 4 which has received the HTTP response transmits the received HTTP response to the client apparatus X along with a session ID for identifying the service providing server X which is a transmission source of the HTTP response (S104). The session ID is included in the HTTP response as cookie information.

A log-in screen is displayed in the client apparatus X which has received the HTTP response. In addition, the cookie information in the HTTP response is preserved in the storage device. FIG. 4A is a diagram illustrating an example of the log-in screen. The user logs in to an image processing service by using the log-in screen. That is, the user enters authentication information (a user name and a password) of the user in the log-in screen. In addition, a predetermined button is pressed.

Figure 3:
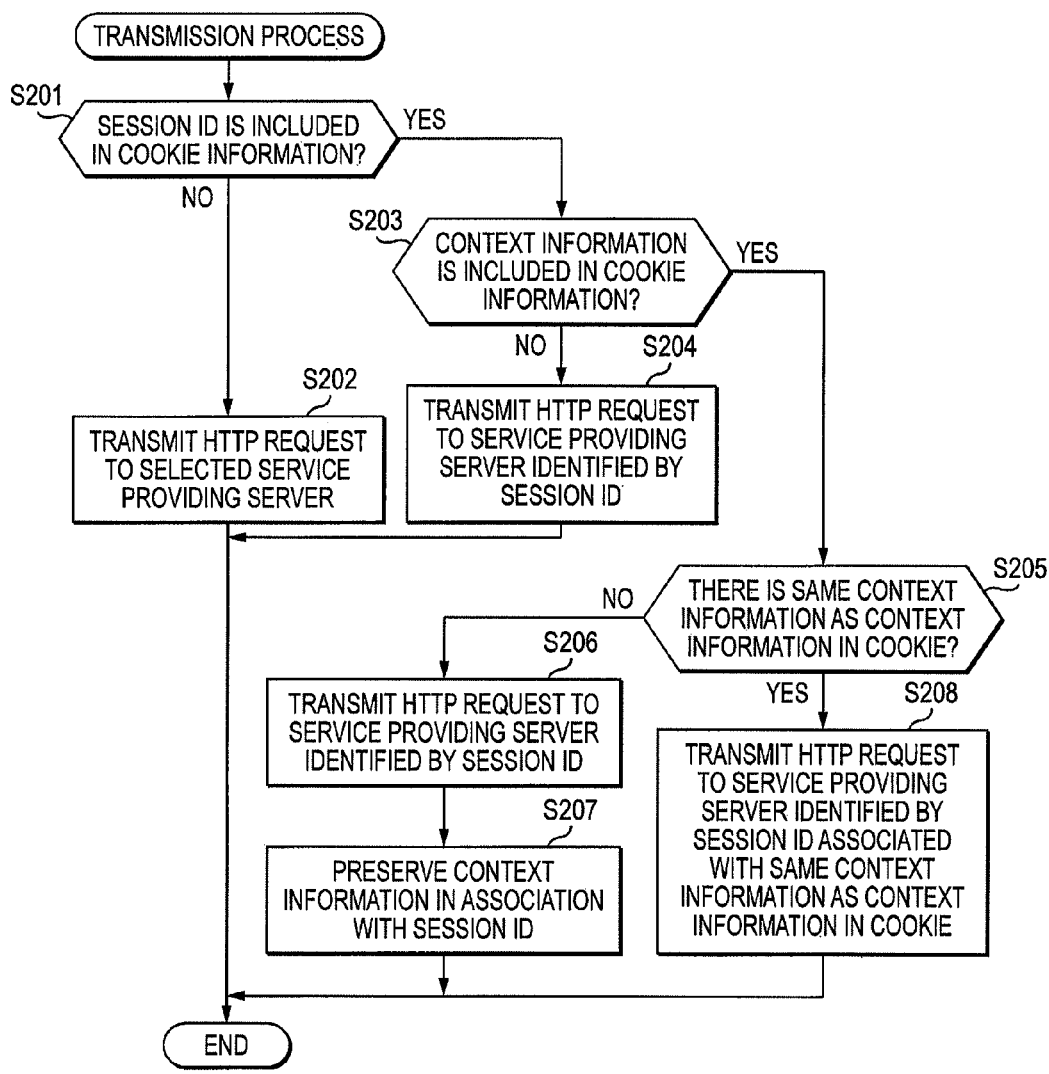
FIG. 3 is a diagram illustrating a transmission process performed in a session management server.
Figure 5:
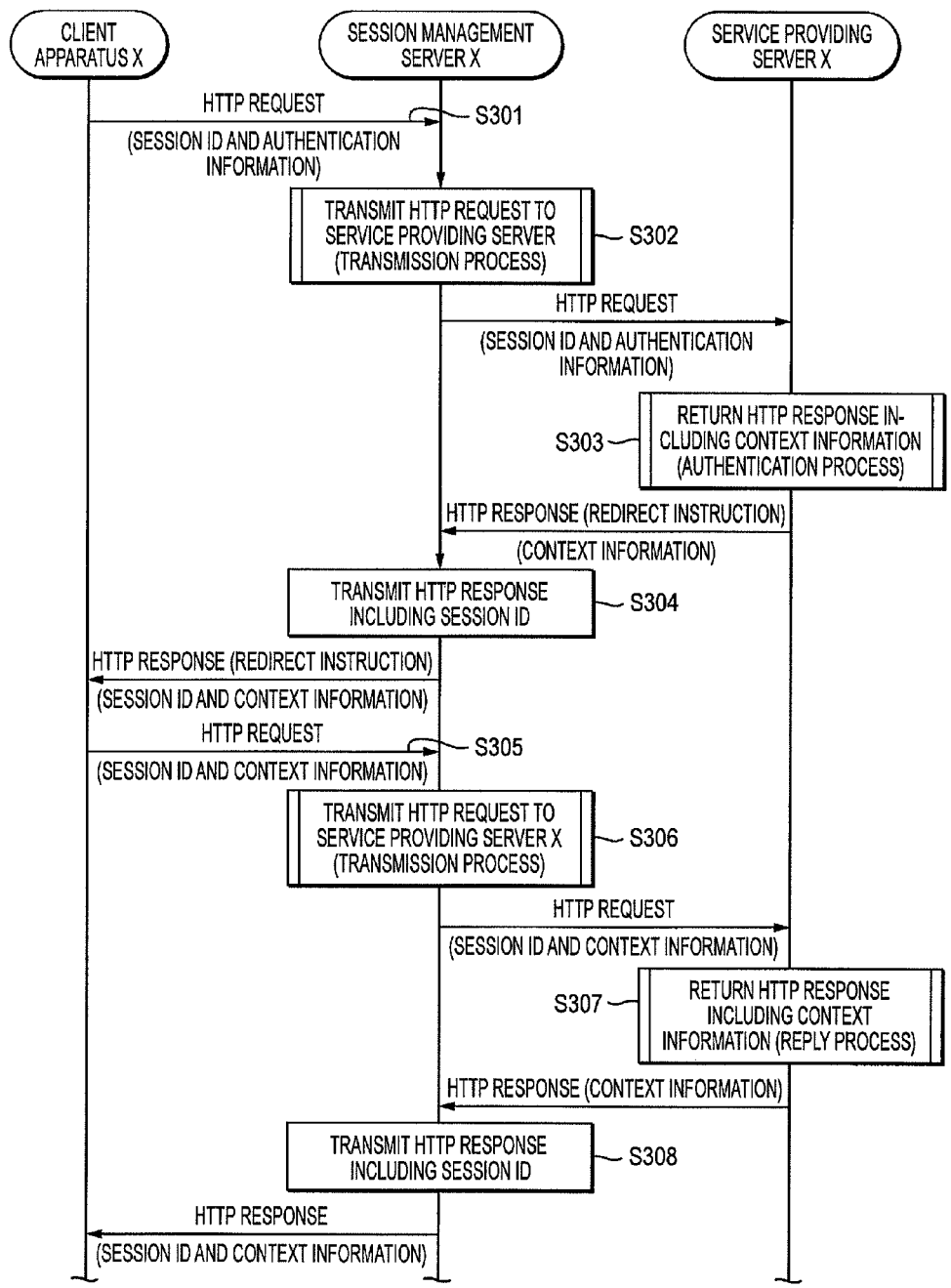
FIG. 5 is a sequence diagram illustrating a process performed in the session management system.

FIG. 5 is a sequence diagram illustrating a process performed in the session management system 1 when the user presses the predetermined button on the log-in screen. The client apparatus X transmits an HTTP request including the cookie information stored in the storage device and the entered authentication information to the session management server 4 (S301). When the HTTP request transmitted from the client apparatus X is received, the session management server 4 (a request reception unit and a request transmission unit) transmits the received HTTP request to the service providing server X (S302). Specifically, in step S302, the transmission process illustrated in FIG. 3 is performed. In this step, the session ID of the service providing server X is included in the cookie information. For this reason, step S203 is performed, and the session management server 4 determines whether or not context information described later is further included in the cookie information (S203). In this step, the context information is not included in the cookie information. Therefore, the session management server 4 transmits the HTTP request to the service providing server X which is identified by the session ID in the cookie information (S204).

Figure 6:
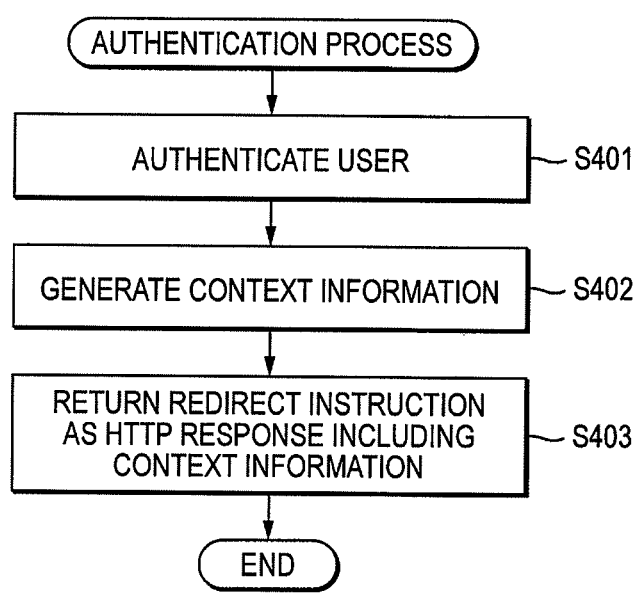
FIG. 6 is a diagram illustrating an authentication process performed in the service providing server.

The service providing server X (a reception unit) receives the HTTP request transmitted from the session management server 4. In addition, a redirect instruction is returned to the session management server 4 as an HTTP response (S303). In this step, the authentication information is included in the HTTP request. For this reason, the service providing server X having received the HTTP request performs an authentication process illustrated in FIG. 6 in step S303. In other words, the service providing server X (an authentication unit) authenticates the user on the basis of the authentication information in the HTTP request and storage content of the user database 8 (S401). Specifically, the service providing server X determines whether or not the authentication information in the HTTP request is stored in the user database 8. In addition, if the user is authenticated, context information unique to the authenticated user is generated according to a predetermined context generation algorithm on the basis of the authentication information in the HTTP request (S402). For example, the service providing server X encrypts a user name of the authenticated user so as to generate context information. In addition, the context generation algorithm used to generate context information is used in common by all the service providing servers 6. Further, the service providing server X returns a redirect instruction to the session management server 4 as an HTTP response along with the context information (S403). The context information is included in the HTTP response as cookie information.

When the HTTP response is received in step S304, the session management server 4 (a transmission unit) transmits the received HTTP response to the client apparatus X along with a session ID of the service providing server X which is a transmission source of the HTTP response (S304). The session ID is included in the HTTP response as cookie information.

The client apparatus X having received the HTTP response preserves the cookie information in the HTTP response in the storage device. In addition, an HTTP request including the cookie information is transmitted to the session management server 4 (S305).

When the HTTP request transmitted from the client apparatus X is received, the session management server 4 (a request reception unit and a request transmission unit) transmits the received HTTP request to the service providing server X (S306). Specifically, in step S306, the session management server 4 (a request transmission unit) performs the transmission process illustrated in FIG. 3 in the same manner as in step S302. In this step, both the session ID of the service providing server X and the context information are included in the cookie information. For this reason, step S205 and the subsequent steps are performed. In Embodiment 1, a session management database (hereinafter, referred to as a session management DB) which stores context information in association with a session ID is provided in the storage device of the session management server 4, and, in step S205, the session management server 4 determines whether or not the same context information as the context information in the cookie information is stored in the session management DB (S205). In this step, the same context information as the context information in the cookie information is not stored. For this reason, the session management server 4 transmits an HTTP request to the service providing server 6 (that is, the service providing server X) identified by the session ID in the cookie information (S206). In addition, the context information in the cookie information is stored in the session management DB in association with the session ID (S207).

Figure 7:
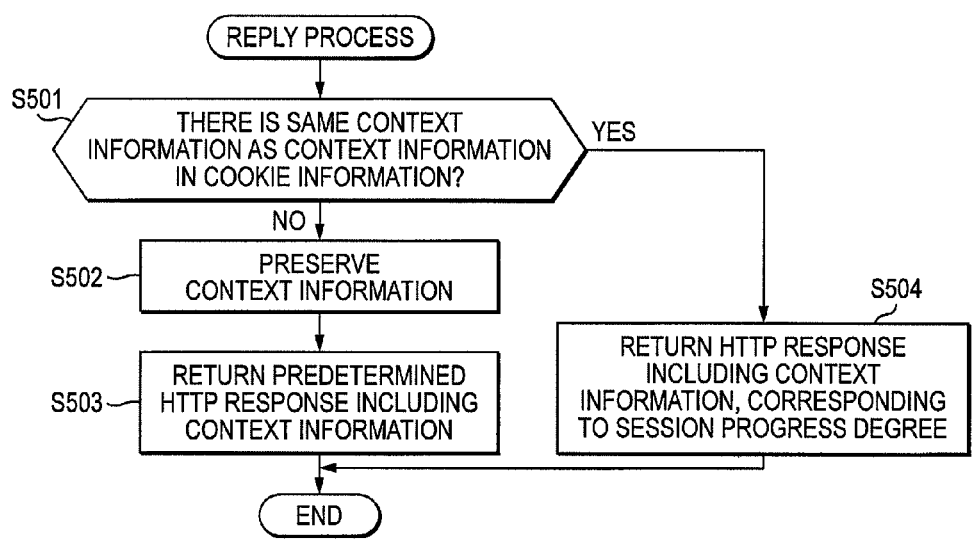
FIG. 7 is a diagram illustrating a reply process performed in the service providing server.

The service providing server X (a reception unit) receives the HTTP request transmitted from the session management server 4. In addition, an HTTP response is returned to the session management server 4 along with the context information in the HTTP request (S307). Since the context information is included in the HTTP request in this step, the service providing server X performs a reply process illustrated in FIG. 7 in step S307. In other words, in Embodiment 1, a context management database (hereinafter, referred to as a context management DB) in which context information is associated with a session progress degree indicating a progress degree of a session is provided in the storage device of each service providing server 6. The service providing server X determines whether or not the same context information as the context information in the cookie information is stored in the context management DB (S501). In this step, the same context information as the context information in the cookie information is not stored in the context management DB. Therefore, the context information in the cookie information is stored in the context management DB in association with a session progress degree indicating a progress degree of a session in the current step (S502). In addition, a predetermined HTTP response is transmitted to the session management server 4 along with the context information in the cookie information (S503). Specifically, a web page of a setting screen illustrated in FIG. 4B is transmitted as the HTTP response. The context information is included in the HTTP response as cookie information.

In addition, in step S308, the session management server 4 having received the HTTP response transmits the received HTTP response to the client apparatus X along with a session ID of the service providing server X in the same manner as in step S304 (S308). The session ID is included in the HTTP response as cookie information. As a result, a screen corresponding to the HTTP response is displayed in the client apparatus X having received the HTTP response. In this step, the setting screen illustrated in FIG. 4B is displayed. In addition, the cookie information in the HTTP response is preserved in the storage device.

Figure 8:
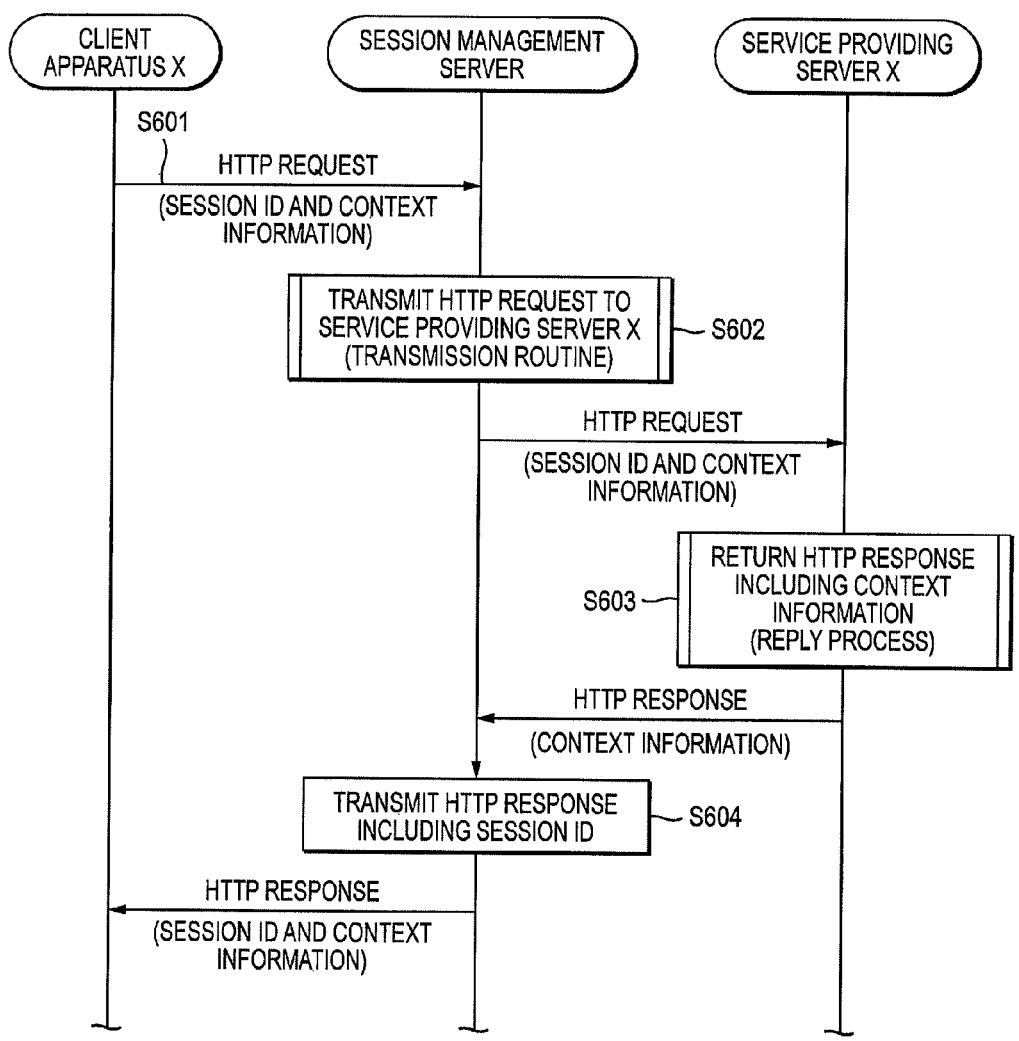
FIG. 8 is a sequence diagram illustrating a process performed in the session management system.

Then, the user executes an operation of performing a session with the service providing server X in the client apparatus X until a guide screen illustrated in FIG. 4C is displayed. Whenever an operation of performing a session is executed, a process illustrated in a sequence diagram of FIG. 8 is performed in the session management system 1.

In other words, the client apparatus X transmits an HTTP request including cookie information stored in the storage device to the session management server 4 (S601). The cookie information includes a session ID of the service providing server X and context information unique to the user.

When the HTTP request transmitted from the client apparatus X is received, the session management server 4 (a request reception unit and a request transmission unit) transmits the received HTTP request to the service providing server X (S602). Specifically, the session management server 4 (a request transmission unit) performs the transmission process illustrated in FIG. 3 in step S602 in the same manner as in steps S302 and S308. In this step, the cookie information includes both the session ID of the service providing server X and the context information. In addition, since the same context information as the context information in the cookie information has been stored in the session management DB (Y in step S205), the session management server 4 performs step S208. In other words, the session management server 4 transmits the HTTP request to the service providing server 6 (that is, the service providing server X) identified by the session ID which is associated with the same context information as the context information in the cookie information (S208).

The service providing server X (a reception unit) receives the HTTP request transmitted from the session management server 4. In addition, an HTTP response is returned to the session management server 4 (S603). In this step, since the context information is included in the HTTP request, in step S603, the service providing server X performs the reply process illustrated in FIG. 7 in the same manner as in step S307. Further, since the same context information as the context information in the cookie information has been stored in the context management DB (Y in step S501), the service providing server X transmits a HTTP response corresponding to a session progress degree associated with the same context information as the context information in the cookie information, to the session management server 4 along with the context information (S504). Furthermore, the session progress degree associated with the same context information as the context information in the cookie information is updated. Moreover, the context information is included in the HTTP response as cookie information.

In addition, in step S604, the session management server 4 having received the HTTP response transmits the received HTTP response to the client apparatus X along with a session ID of the service providing server X in the same manner as in step S304. The session ID is included in the HTTP response as cookie information. As a result, a screen corresponding to the HTTP response is displayed in the client apparatus X having received the HTTP response.

Here, a case is assumed in which the user first logs in to an image processing service in the client apparatus 2a so as to perform a session with the service providing server X until the guide screen illustrated in FIG. 4C is displayed, and then logs in to the image processing service again in the client apparatus 2b. In this case, an HTTP request which is initially transmitted from the client apparatus 2b may be transmitted to a service providing server Y different from the service providing server X in step S102 of FIG. 2. However, for the following reason, even in this case, a session which has been performed with the service providing server X can be performed with the service providing server X again.

Figure 9:
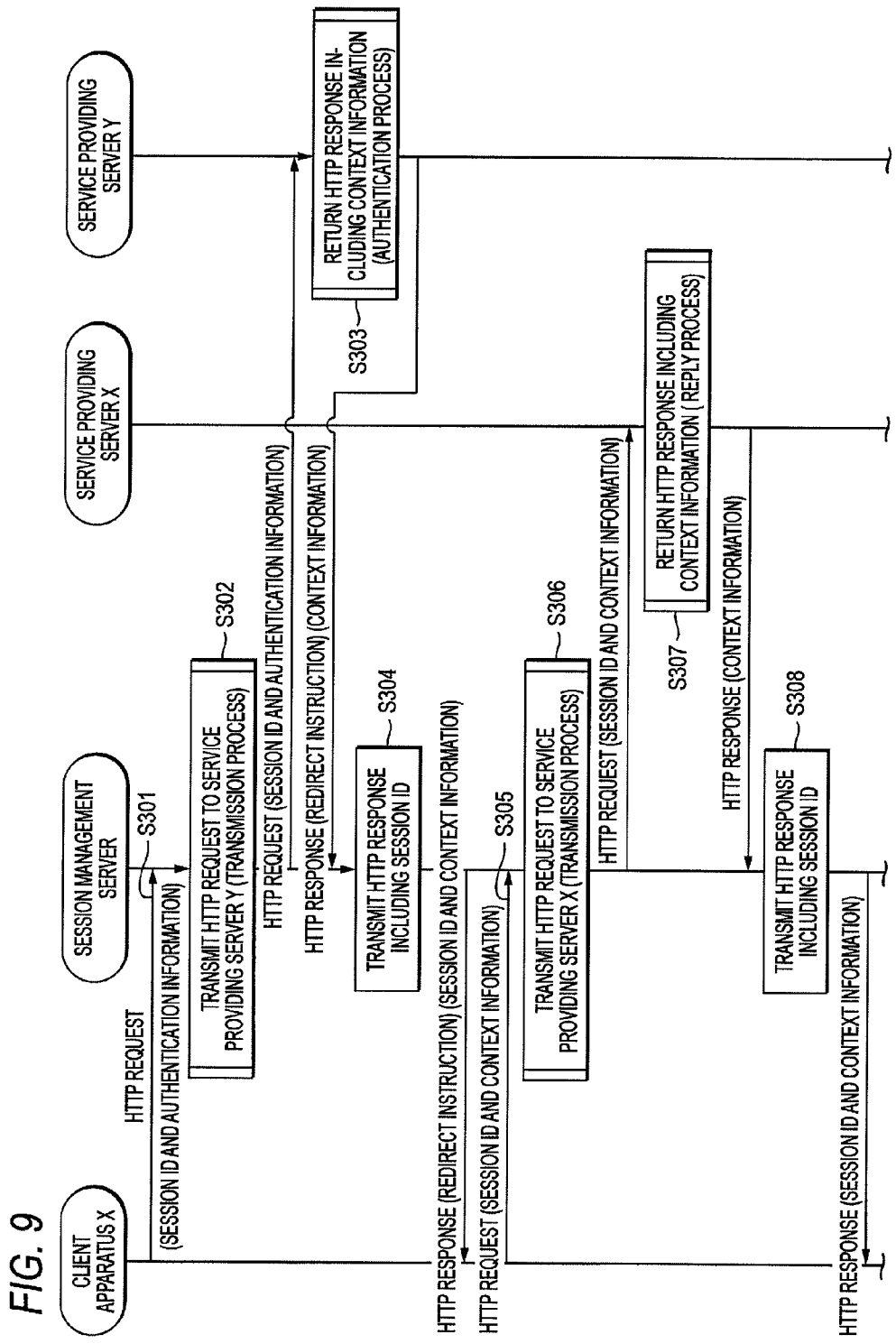
FIG. 9 is a sequence diagram illustrating a process performed in the session management system.

FIG. 9 is a sequence diagram illustrating a process performed in the session management system 1 when an HTTP request which is initially transmitted from the client apparatus 2b which is the client apparatus X is transmitted to the service providing server Y. FIG. 9 will be described through a comparison with FIG. 5. In this case, for example, cookie information of the HTTP request transmitted in step S301 includes a session ID of the service providing server Y. For this reason, the HTTP request is transmitted to the service providing server Y in step S302 unlike in FIG. 5.

However, in step S303, context information unique to the user is generated, and is transmitted to the client apparatus X. For this reason, an HTTP request which is subsequently transmitted from the client apparatus X includes context information (refer to S305, and S601 of FIG. 8). In addition, in a case where the same context information as the context information in the HTTP request is stored in the session management DB, a transmission destination of the HTTP request becomes the service providing server 6 which is identified by a session ID stored in the session management DB in association with the context information (refer to S208 of FIG. 3). Therefore, since the context information of the user has been stored in the session management DB in association with a session ID of the service providing server X when a session is performed with the service providing server X, the HTTP request is transmitted to the service providing server X in step S306 or S602 of FIG. 8 at all times. Thus, the user who logs in again to a service in the client apparatus 2b can perform the session which has been performed with the service providing server X by using the client apparatus 2a, with the service providing server X again. For this reason, for example, when the user logs in again, not the setting screen illustrated in FIG. 4B but an instruction standby screen of FIG. 4D which is to be displayed next to the guide screen of FIG. 4C is displayed. In addition, when an operation of performing a session is executed, a session is performed with the service providing server X as illustrated in the sequence diagram of FIG. 8.

Figure 10:
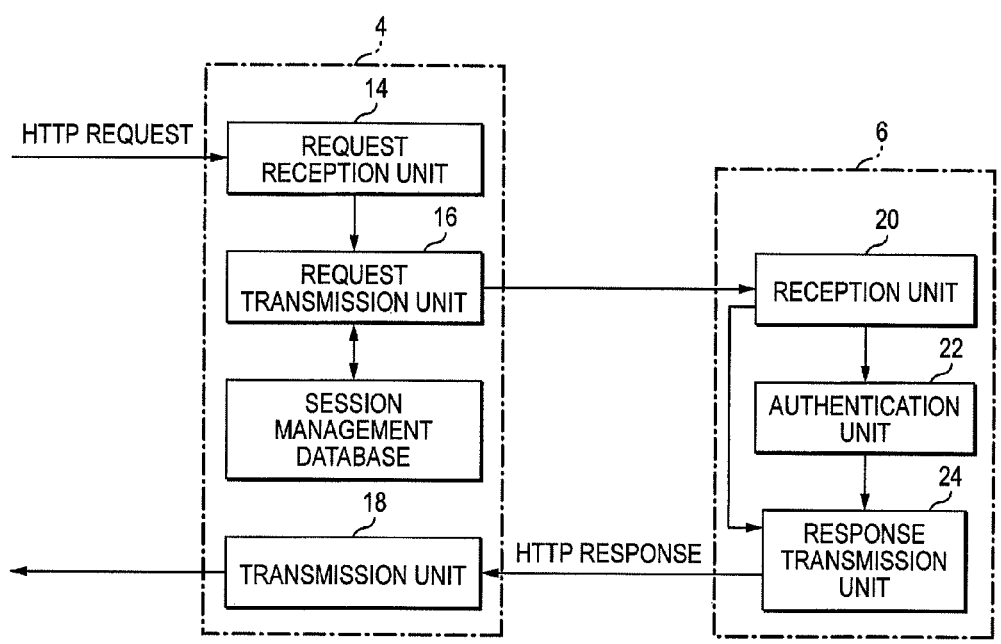
FIG. 10 is a functional block diagram illustrating a functional group realized in the session management system.

FIG. 10 is a functional block diagram illustrating a functional group realized in the session management system 1. As illustrated in FIG. 10, in the session management system 1, a request reception unit 14, a request transmission unit 16, a transmission unit 18, a reception unit 20, an authentication unit 22, and a response transmission unit 24 are realized. The request reception unit 14, the request transmission unit 16, and the transmission unit 18 are realized by the microprocessor executing a program stored in the storage device in the session management server 4. The reception unit 20, the authentication unit 22, and the response transmission unit 24 are realized by the microprocessor executing a program stored in the storage device in the service providing server 6.

The request reception unit 14 receives an HTTP request transmitted from the client apparatus 2. The request transmission unit 16, in principle, transmits the HTTP request received by the request reception unit 14, to the service providing server 6 identified by of a session ID in the corresponding HTTP request (refer to S302, S306, and the like of FIG. 5).

The reception unit 20 receives the HTTP request transmitted from the session management server 4. In a case where identification information (here, a user name) for identifying a user is included in the HTTP request received by the reception unit 20, the authentication unit 22 authenticates the user identified by the identification information on the basis of the identification information (refer to S303 of FIG. 5, and FIG. 6).

The response transmission unit 24 returns an HTTP response corresponding to the HTTP request data received by the reception unit 20, to the session management server 4. In addition, after the request transmission unit 16 transmits the HTTP request, the transmission unit 18 receives the HTTP response which is returned from the service providing server 6 which is a transmission destination of the HTTP request, and transmits the received HTTP response to the client apparatus 2 which is a transmission source of the HTTP request along with a session ID for identifying the service providing server 6 which is a transmission destination (refer to S304, S308, and the like FIG. 5).

However, in a case where the identification information for identifying the user is included in the HTTP response received by the reception unit 20, the response transmission unit 24 transmits the HTTP response to the session management server 4 along with context information unique to the user which is authenticated by the authentication unit 22 on the basis of the identification information (refer to S303 FIG. 5). In addition, in a case where the context information is also received from the service providing server 6 which is a transmission destination of the HTTP response along with the HTTP response after the request transmission unit 16 transmits the HTTP request, the transmission unit 18 transmits the HTTP response to the client apparatus 2 which is a transmission source of the HTTP request along with not only the session ID for identifying the service providing server 6 which is a transmission source but also the context information received together therewith (refer to S304, S308, and the like of FIG. 5). In the above-described manner, after the user authentication is completed, the HTTP request with the context information is transmitted from the client apparatus 2.

In addition, the request transmission unit 16 assigns a transmission destination as follows when the HTTP request including the context information is received by the request reception unit 14. In other words, in a case where the same context information as the context information included in the HTTP request is not stored in the session management DB, the context information included in the HTTP request is stored in the session management DB in association with a session ID, and the HTTP request is transmitted to the service providing server 6 identified by the session ID included in the HTTP request (refer to FIG. 3). On the other hand, in a case where the same context information as the context information included in the HTTP request is stored in the session management DB, the HTTP request is transmitted to the service providing server 6 identified by the session ID which is stored in association with the context information (refer to FIG. 3).

In addition, Embodiment 1 of the present invention, for example, the session management server 4 may additionally perform the following process in step S304. In other words, the session management server 4 may determine whether or not the same context information as context information included in cookie information in a received HTTP response is stored in the session management DB. Further, in a case where the same context information as context information included in the cookie information in the received HTTP response is not stored in the session management DB, the context information included in the cookie information may be preserved in the session management DB in association with a session ID of the service providing server X.

In addition, for example, the session management system 1 may include plural session management servers 4. In this case, the client apparatus 2 may transmit an HTTP request to any one of the session management servers 4.

Embodiment 2

Figure 11:
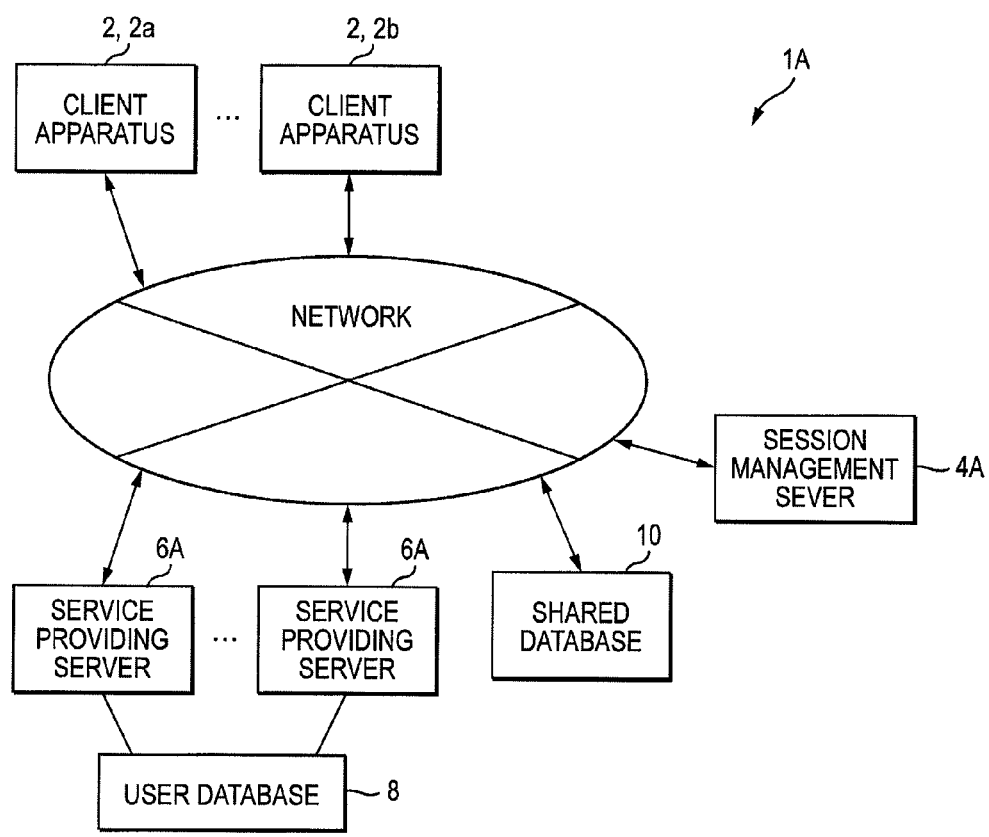
FIG. 11 is a diagram illustrating a configuration of a session management system according to Embodiment 2 of the present invention.

FIG. 11 is a diagram illustrating a configuration of a session management system 1A according to Embodiment 2 of the present invention. As illustrated in FIG. 11, the session management system 1A includes plural client apparatuses 2, a session management server 4A, plural service providing servers 6A which provide an information processing service, and a shared database 10. These apparatuses are connected to a network.

A browser application is installed in each of the client apparatuses 2, and a user logs in to an information processing service by using the browser application, so as to perform a HTTP session for using the information processing service. In Embodiment 2, a client apparatus 2a is realized by a personal computer which includes a microprocessor, a storage device such as a memory and a hard disk, an input device such as a mouse and a keyboard, a network interface, and a display. In addition, a client apparatus 2b is realized by an image processing system (a so-called multifunction machine) which includes a microprocessor, a storage device such as a memory and a hard disk, a network interface, a touch screen, and a scanner.

The session management server 4A and each of the service providing servers 6A are server computers which include a microprocessor, a storage device such as a memory and a hard disk, a network interface, and the like. The session management server 4A and the service providing server 6A respectively perform information processes according to programs stored in the storage devices. The programs may be received from the network so as to be stored in the storage devices, and may be read from a computer readable information storage medium so as to be stored in the storage devices. The session management server 4A is also referred to as a load balancer. In addition, the service providing servers 6A provide a common information processing service to a user on a cloud, and provide an image processing service of translating a document image transmitted from the client apparatus 2, to the user in Embodiment 2. Each service providing server 6A is connected to a user database 8. The user database 8 stores authentication information (a user name (user identification information) and a password) of a user who is registered as a user of a service, and the service providing server 6A performs user authentication by using the user database 8.

The shared database 10 is a database shared by the respective service providing servers 6A, and stores context information described later in association with a session ID for identifying the service providing server 6A. Here, it is assumed that context information has not yet been stored in the shared database 10.

Figure 12:
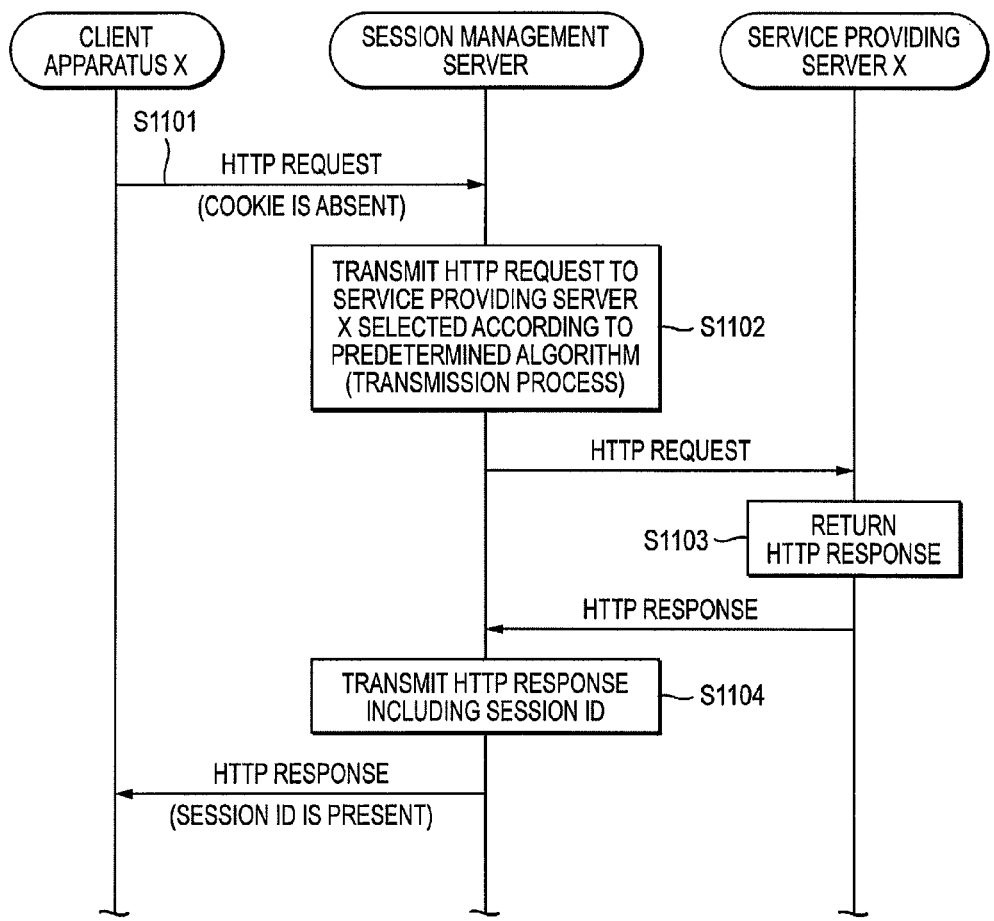
FIG. 12 is a sequence diagram illustrating a process performed in the session management system.

A description will be made of a case of using an image processing service. In Embodiment 2, a user activates a browser application in the client apparatus 2, and enters a uniform resource locator (URL) of a log-in screen at a predetermined location. FIG. 12 is a sequence diagram illustrating a process performed in the session management system 1A when the URL of the log-in screen is entered. Hereinafter, the client apparatus 2 in which the URL of the log-in screen is entered is referred to as a client apparatus X. When the user enters the URL of the log-in screen, the client apparatus X transmits an HTTP request (request data) to the session management server 4A by using the browser application (step S1101). The HTTP request includes various data items such as cookie information held in the storage device of the client apparatus X. Here, since the client apparatus X does not hold cookie information, the cookie information is not included in the HTTP request.

The session management server 4A receives the HTTP request which is transmitted from the client apparatus X. In addition, the received HTTP request transmits the service providing server 6A which is selected according to a predetermined algorithm (for example, a round-robin algorithm) (S1102). Specifically, the session management server 4A performs a transmission process illustrated in FIG. 13 when the HTTP request is received. In other words, the session management server 4A determines whether or not a session ID is included in cookie information of the HTTP request (S1201).

As described above, in this step, there is no cookie information in the HTTP request. Therefore, the session management server 4A selects the service providing server 6A which is a transmission destination according to the above-described algorithm, and transmits the HTTP request to the selected service providing server 6A (S1202). In addition, here, it is assumed that a service providing server X is selected.

The service providing server X which has received the HTTP request returns an HTTP response corresponding to the received HTTP request to the session management server 4A (S1103). In this step, a web page of the log-in screen is returned as the HTTP response. In addition, the session management server 4A which has received the HTTP response transmits the received HTTP response to the client apparatus X along with a session ID for identifying the service providing server X which is a transmission source of the HTTP response (S1104). The session ID is included in the HTTP response as cookie information.

A log-in screen is displayed in the client apparatus X which has received the HTTP response. In addition, the cookie information in the HTTP response is preserved in the storage device. FIG. 14A is a diagram illustrating an example of the log-in screen. The user logs in to an image processing service by using the log-in screen. That is, the user enters authentication information (a user name and a password) of the user in the log-in screen. In addition, a predetermined button is pressed.

Figure 13:
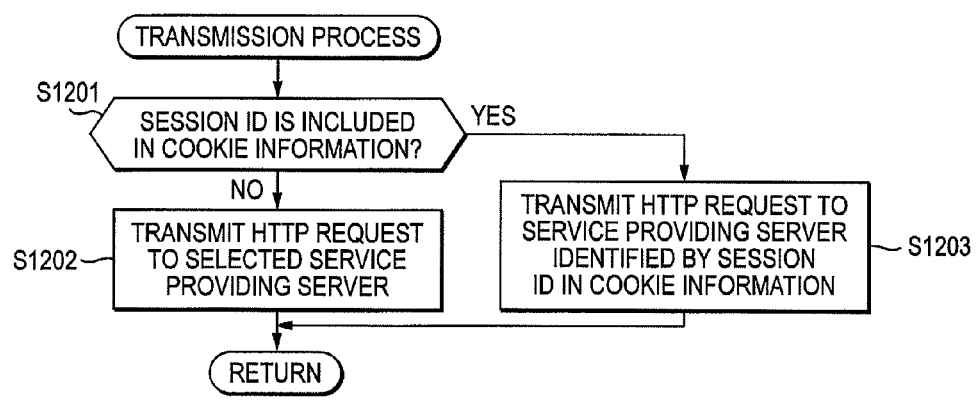
FIG. 13 is a diagram illustrating a transmission process performed in a session management server.

FIG. 15 is a sequence diagram illustrating a process performed in the session management system 1A when the user presses the predetermined button on the log-in screen. The client apparatus X transmits an HTTP request including the cookie information stored in the storage device and the entered authentication information to the session management server 4A (S1301). When the HTTP request transmitted from the client apparatus X is received, the session management server 4A (a request reception unit and a request transmission unit) transmits the received HTTP request to the service providing server X (S1302). Specifically, in step S1302, the transmission process illustrated in FIG. 13 is performed. In this step, a session ID is included in the cookie information. For this reason, step S1203 is performed, and the session management server 4A transmits the HTTP request to the service providing server X which is identified by the session ID in the cookie information (S1203).

The service providing server X (a reception unit) receives the HTTP request transmitted from the session management server 4A. The authentication information is included in the HTTP request. Therefore, the service providing server X (an authentication unit) authenticates the user on the basis of the authentication information in the HTTP request and storage content of the user database 8 (S1303). Specifically, the service providing server X determines whether or not the authentication information in the HTTP request is stored in the user database 8. In addition, if the user is authenticated, the service providing server X (a generation unit) generates context information unique to the authenticated user according to a predetermined context generation algorithm on the basis of the authentication information in the HTTP request (S1304). For example, the service providing server X encrypts a user name of the authenticated user so as to generate the context information. In addition, the context generation algorithm used to generate context information is used in common by all the service providing servers 6A.

Figure 16:
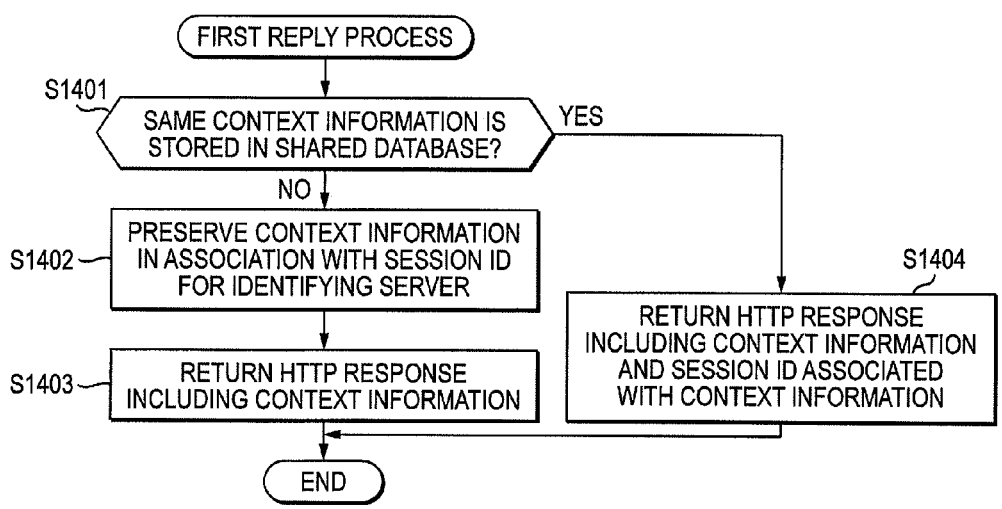
FIG. 16 is a diagram illustrating a first reply process performed in a service providing server.

Further, the service providing server X returns an HTTP response to the session management server 4A as a redirect instruction along with the context information (S1305). Specifically, the service providing server X performs a first reply process illustrated in FIG. 16 in step S1305. In other words, the service providing server X (a determination unit) determines whether or not the same context information as the context information generated in step S1304 is stored in the shared database 10 (S1401). As described above, no context information has yet been stored in the shared database. For this reason, the service providing server X stores the context information generated in step S1304 in the shared database 10 in association with a session ID for identifying the service providing server X (S1402), and transmits an HTTP response to the session management server 4A as a redirect instruction along with the context information generated in step S1304 (S1403). In addition, the context information is included in the HTTP response as cookie information.

When the HTTP response is received in step S1306, the session management server 4A (a transmission unit) transmits the received HTTP response to the client apparatus X along with the session ID of the service providing server X which is a transmission source of the HTTP response (S1306). Specifically, the session management server 4A performs a response transmission process illustrated in FIG. 17 in step S1306. In other words, the session management server 4A determines whether or not a session ID is included in the cookie information which is included in the HTTP response (S1501). In this step, a session ID is not included in the cookie information. For this reason, the session management server 4A transmits the HTTP response to the client apparatus X along with the session ID of the service providing server X which is a transmission source of the HTTP response (S1502). In addition, the session ID is included in the HTTP response as cookie information.

The client apparatus X having received the HTTP response preserves the cookie information in the HTTP response in the storage device. In addition, an HTTP request including the cookie information is transmitted to the session management server 4A (S1307). The cookie information includes the session ID of the service providing server X and the context information.

When the HTTP request transmitted from the client apparatus X is received, the session management server 4A (a request reception unit and a request transmission unit) transmits the received HTTP request to the service providing server X (S1308). Specifically, in step S1308, the session management server 4A (a request transmission unit) performs the transmission process illustrated in FIG. 13. In this step, the session ID is included in the cookie information. For this reason, step S1203 is performed, and the session management server 4A transmits an HTTP request to the service providing server X identified by the session ID in the cookie information which is included in the HTTP request (S1203).

Figure 18:
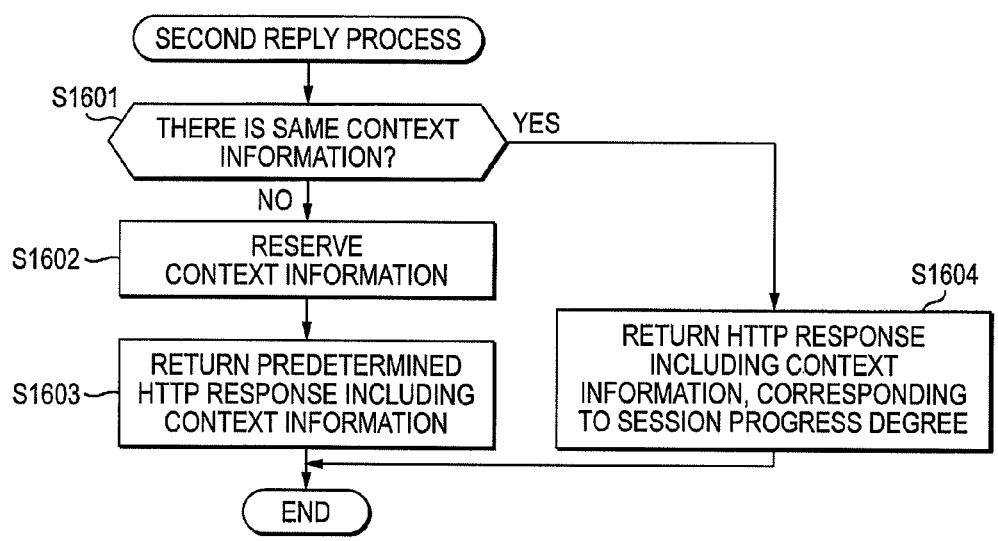
FIG. 18 is a diagram illustrating a second reply process performed in the service providing server.

The service providing server X (a reception unit) receives the HTTP request transmitted from the session management server 4A. In addition, an HTTP response is returned to the session management server 4A along with the context information in the HTTP request (S1309). In this step, the context information is included in the HTTP request. For this reason, the service providing server X performs a second reply process illustrated in FIG. 18 in step S1309. In other words, in Embodiment 2, a context management database (hereinafter, referred to as a context management DB) in which context information is associated with a session progress degree indicating a progress degree of a session is provided in the storage device of each service providing server 6A. The service providing server X determines whether or not the same context information as the context information in the cookie information is stored in the context management DB (S1601). In this step, the same context information as the context information in the cookie information is not stored in the context management DB. Therefore, the context information in the cookie information is stored in the context management DB in association with a session progress degree indicating a progress degree of a session in the current step (S1602). In addition, a predetermined HTTP response is transmitted to the session management server 4A along with the context information in the cookie information (S1603). Specifically, the service providing server X transmits a web page of a setting screen illustrated in FIG. 14B as the HTTP response. In addition, the context information is included in the HTTP response as cookie information.

When the HTTP response is received in step S1310, the session management server 4A (a transmission unit) transmits the received HTTP response to the client apparatus X along with a session ID of the service providing server X which is a transmission source of the HTTP response (S1310). Specifically, the session management server 4A performs the response transmission process illustrated in FIG. 17 in step S1310. Here, since a session ID is not included in the HTTP response, step S1502 is performed, and thus the HTTP response is transmitted along with the session ID of the service providing server X (S1502). As a result, a screen corresponding to the HTTP response is displayed in the client apparatus X having received the HTTP response. In this step, the setting screen illustrated in FIG. 14B is displayed. In addition, the cookie information in the HTTP response is preserved in the storage device.

Figure 19:
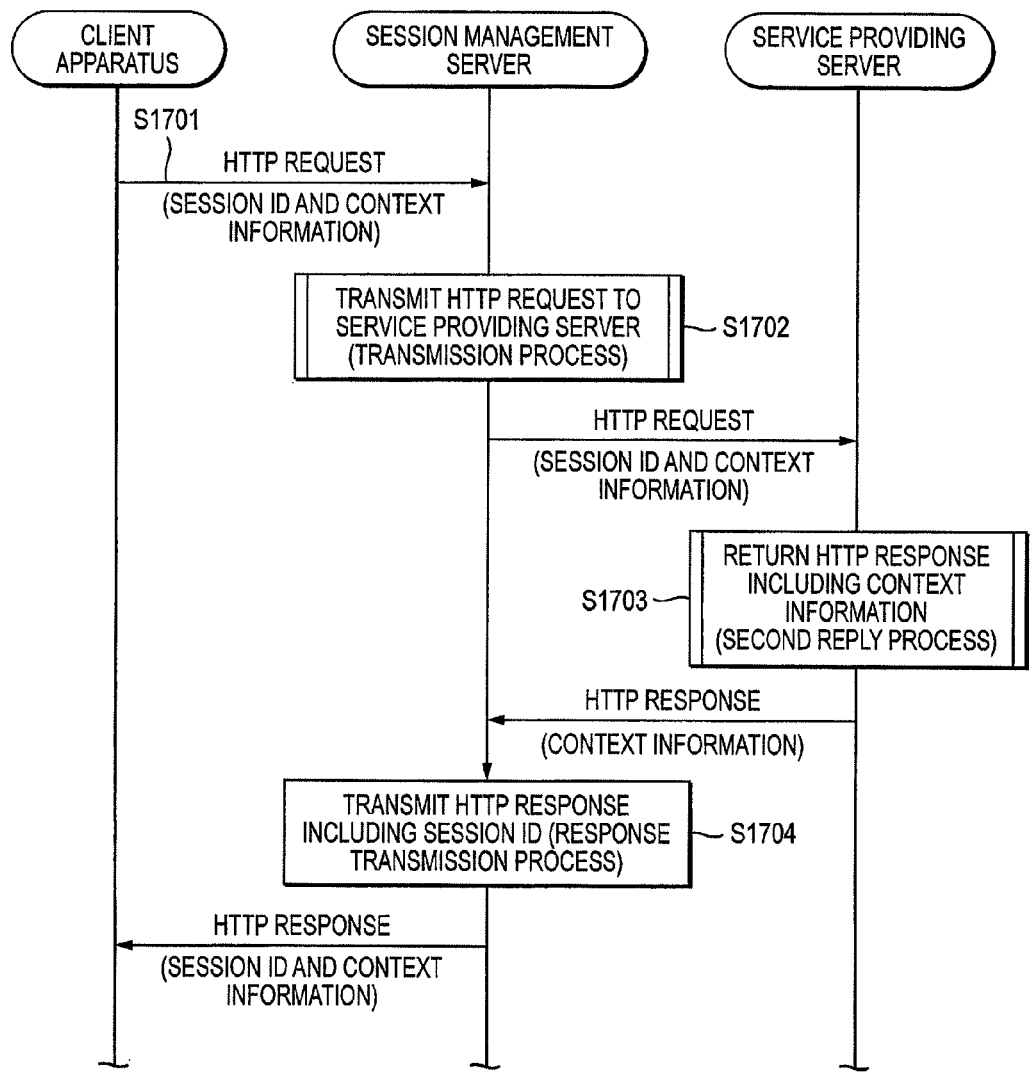
FIG. 19 is a sequence diagram illustrating a process performed in the session management system.

Then, the user executes an operation of performing a session with the service providing server X in the client apparatus X until a guide screen illustrated in FIG. 14C is displayed. Whenever an operation of performing a session is executed, a process illustrated in a sequence diagram of FIG. 19 is performed in the session management system 1A.

In other words, the client apparatus X transmits an HTTP request including cookie information stored in the storage device to the session management server 4A (S1701). The cookie information includes a session ID of the service providing server X and context information.

When the HTTP request transmitted from the client apparatus X is received, the session management server 4A (a request reception unit and a request transmission unit) transmits the received HTTP request to the service providing server X (S1702). Specifically, the session management server 4A (a request transmission unit) performs the transmission process illustrated in FIG. 13 in step S1702. In this step, the cookie information includes the session ID of the service providing server X. For this reason, step S1203 is performed, and thus the session management server 4A transmits the HTTP request to the service providing server X identified by the session ID in the cookie information which is included in the HTTP request (S1203).

The service providing server X (a reception unit) receives the HTTP request transmitted from the session management server 4A. In addition, an HTTP response is returned to the session management server 4A along with the context information in the HTTP request (S1703). In this step, the context information is included in the HTTP request. For this reason, the service providing server X performs the second reply process illustrated in FIG. 18 in the same manner as in step S1309. In this step, the same context information as the context information in the cookie information has been stored in the context management DB. Therefore, the service providing server X transmits a HTTP response corresponding to a session progress degree associated with the same context information as the context information as the context information in the cookie information, to the session management server 4 along with the context information (S1604). Furthermore, the session progress degree associated with the same context information as the context information in the cookie information is updated. Moreover, the context information is included in the HTTP response as cookie information.

In addition, when the HTTP response is received in step S1704, the session management server 4A (a transmission unit) transmits the received HTTP response to the client apparatus X along with a session ID of the service providing server X which is a transmission source of the HTTP response (S1704). Specifically, the session management server 4A performs the response transmission process illustrated in FIG. 17 in the same manner as in step S1310. Here, since a session ID is not included in the HTTP response, step S1502 is performed, and thus the HTTP response is transmitted along with the session ID of the service providing server X (S1502). The session ID is included in the HTTP response as cookie information. As a result, a screen corresponding to the HTTP response is displayed in the client apparatus X having received the HTTP response.

Here, it is assumed that the user first logs in to an image processing service in the client apparatus 2a so as to perform a session with the service providing server X until the guide screen illustrated in FIG. 14C is displayed, and then logs in to the image processing service again in the client apparatus 2b. In this case, an HTTP request which is initially transmitted from the client apparatus 2b may be transmitted to a service providing server Y different from the service providing server X in step S1102 of FIG. 12. However, for the following reason, even in this case, a session which has been performed with the service providing server X can be performed with the service providing server X again.

Figure 20:
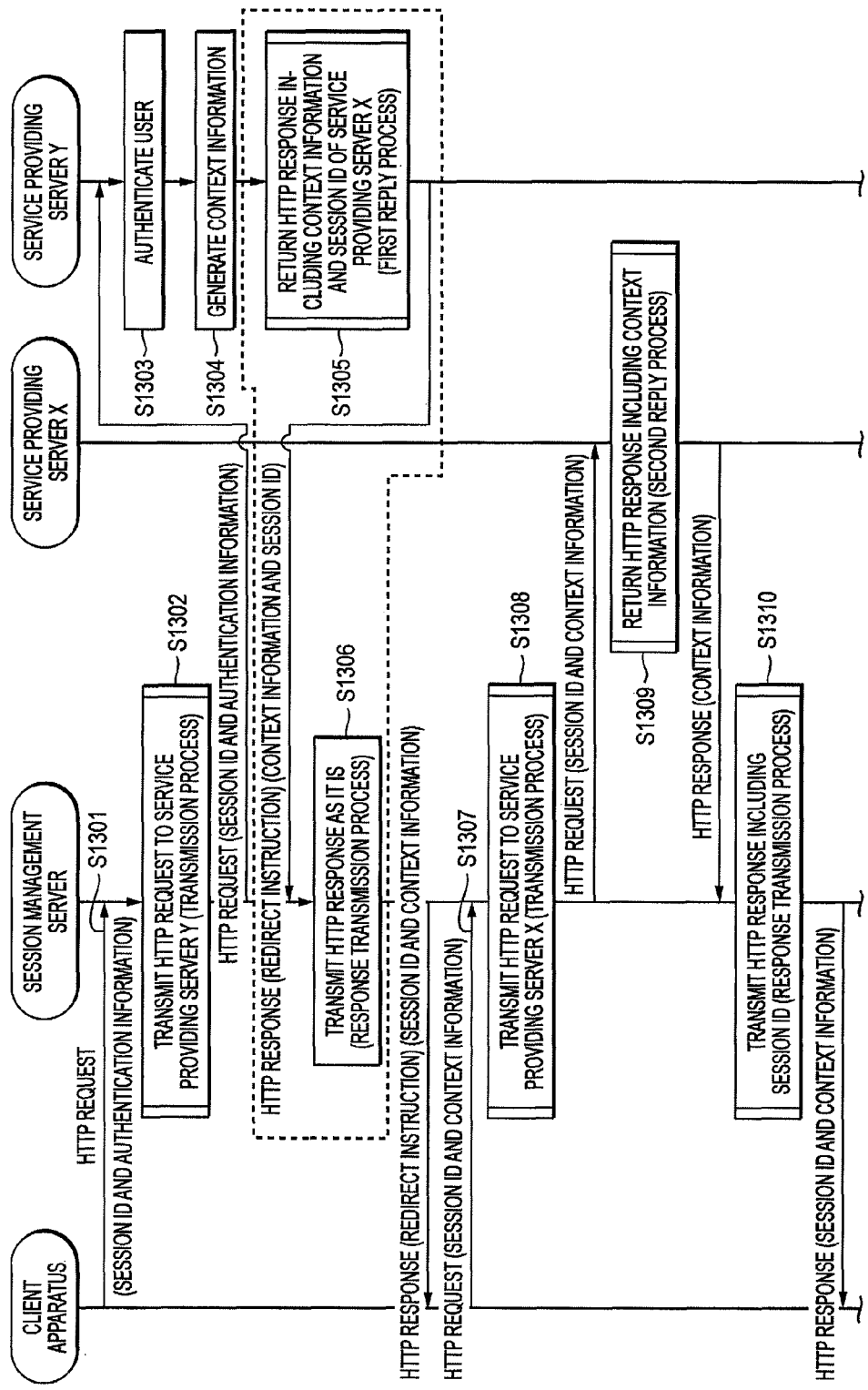
FIG. 20 is a sequence diagram illustrating a process performed in the session management system.

FIG. 20 is a sequence diagram illustrating a process performed in the session management system 1A when an HTTP request which is initially transmitted from the client apparatus 2b which is the client apparatus X is transmitted to the service providing server Y. FIG. 20 will be described through a comparison with FIG. 15. In this case, for example, cookie information of the HTTP request transmitted in step S1301 includes a session ID of the service providing server Y. For this reason, the HTTP request is transmitted to the service providing server Y in step S1302 unlike in FIG. 15.

However, in step S1304, context information unique to the user is generated, and it is determined that the same context information as the context information is stored in the shared database 10 in the first reply process (refer to FIG. 16) in step S1305. In this step, the same context information has been stored in association with a session ID of the service providing server X. For this reason, step S1404 is performed in the first reply process, and, in step S1305, the service providing server Y returns an HTTP response to the session management server 4A along with not only the context information but also a session ID of the service providing server X associated with the context information.

Figure 17:
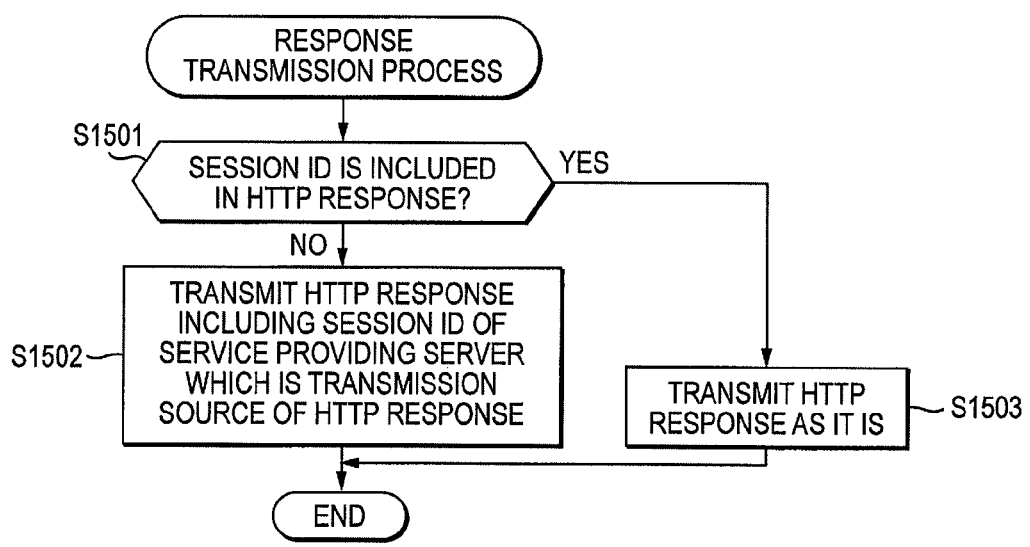
FIG. 17 is a diagram illustrating a response transmission process performed in a session management server.

Further, in the response transmission process illustrated in FIG. 17, if the session ID is included in the HTTP response (Y in step S1501), the session management server 4A transmits the HTTP response to the client apparatus X as it is (S1503). For this reason, the session management server 4A having received the HTTP response in step S1306 transmits the received HTTP response to the client apparatus X. Therefore, in step S1306, not a session ID of the service providing server Y which is a transmission source of the HTTP but the session ID of the service providing server X is transmitted to the client apparatus X. Thus, the session ID of the service providing server X is included in subsequent HTTP requests transmitted from the client apparatus X, and, as a result, the subsequent HTTP requests are transmitted to the service providing server X at all times. Therefore, the user who logs in again to a service in the client apparatus 2*b* can perform the session which has been performed with the service providing server X by using the client apparatus 2*a*, with the service providing server X again. For this reason, for example, when the user logs in again, not the setting screen illustrated in FIG. 14B but an instruction standby screen of FIG. 14D which is to be displayed next to the guide screen of FIG. 14C is displayed. In addition, when an operation of performing a session is executed, a session with the service providing server X is performed as illustrated in the sequence diagram of FIG. 19.

Figure 21:
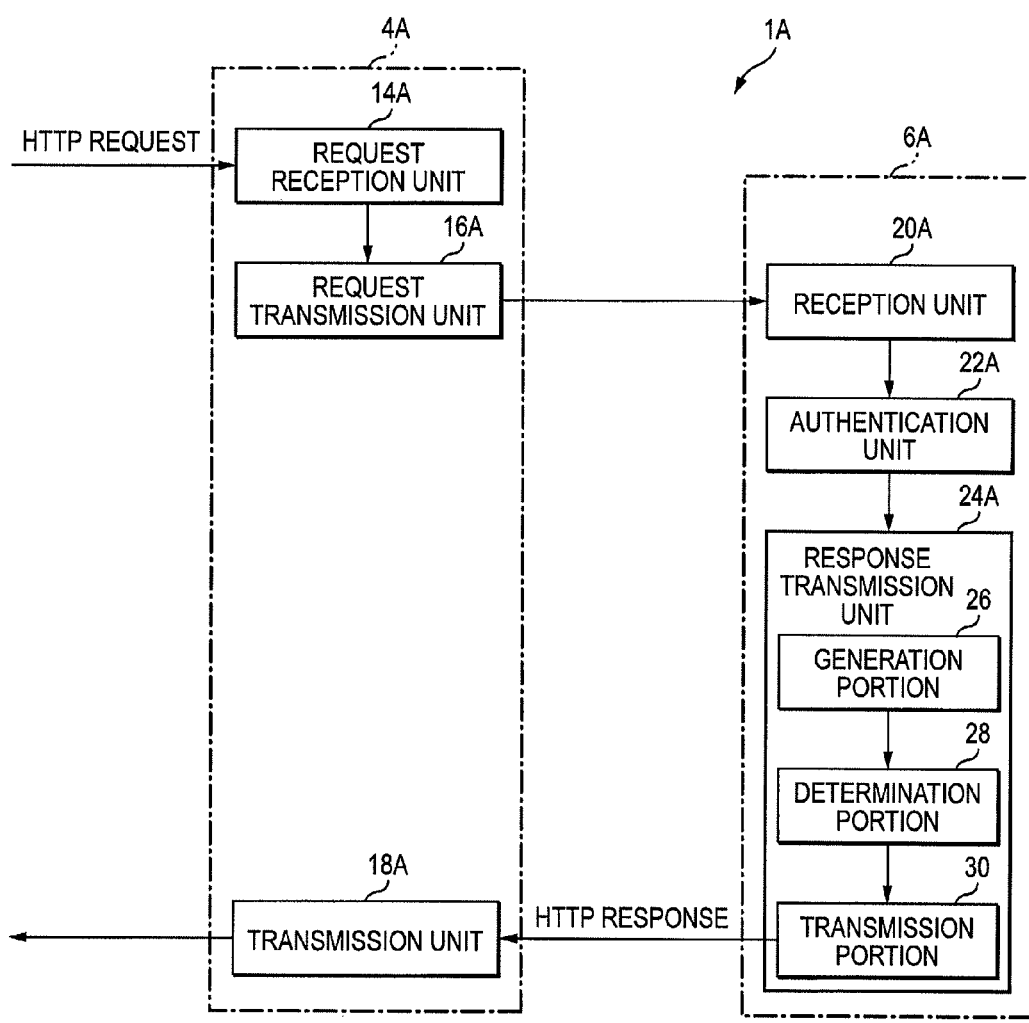
FIG. 21 is a functional block diagram illustrating a functional group realized in the session management system.

FIG. 21 is a functional block diagram illustrating a functional group realized in the session management system 1A. As illustrated in FIG. 21, in the session management system 1A, a request reception unit 14A, a request transmission unit 16A, a transmission unit 18A, a reception unit 20A, an authentication unit 22A, and a response transmission unit 24A are realized. The response transmission unit 24A includes a generation portion 26, a determination portion 28, and a transmission portion 30. The request reception unit 14A, the request transmission unit 16A, and the transmission unit 18A are realized by the microprocessor executing a program stored in the storage device in the session management server 4A. The reception unit 20A, the authentication unit 22A, and the response transmission unit 24A are realized by the microprocessor executing a program stored in the storage device in the service providing server 6A.

The request reception unit 14A receives an HTTP request transmitted from the client apparatus 2. The request transmission unit 16A transmits the HTTP request received by the request reception unit 14A, to the service providing server 6A identified by of a session ID in the corresponding HTTP request (refer to S1102 of FIGS. 12, S1302 and S1308 of FIG. 15, and S1702 of FIG. 19).

The reception unit 20A receives the HTTP request transmitted from the session management server 4A. In a case where identification information (here, a user name) for identifying a user is included in the HTTP request received by the reception unit 20A, the authentication unit 22A authenticates the user identified by the identification information on the basis of the identification information (refer to S1303 of FIG. 15).

The response transmission unit 24A transmits an HTTP response corresponding to the HTTP request received by the reception unit 20A, to the session management server 4A (refer to S1305 and S1307 of FIG. 15, and S1703 of FIG. 19). However, if identification information for identifying a user is included in the HTTP request received by the reception unit 20A, the generation portion 26 generates context information unique to the user which is authenticated by the authentication unit 22A on the basis of the identification information (refer to S1304 of FIG. 15). In addition, the determination portion 28 determines whether or not the same context information as the generated context information is stored in the shared database 10 (refer to S1305 of FIG. 15, and FIG. 16), and if it is determined that the same context information as the generated context information is not stored in the shared database 10, the transmission portion 30 stores the generated context information in association with a session ID for identifying its own apparatus in the shared database 10, and transmits the HTTP response to the session management server 4A (refer to FIG. 16). On the other hand, if it is determined that the same context information as the generated context information is stored in the shared database 10, the transmission portion 30 transmits the HTTP response to the session management server 4 along with a session ID which is stored in the shared database 10 in association with the context information (refer to FIG. 16).

After the request transmission unit 16A transmits the HTTP request, the transmission unit 18A receives the HTTP response which is returned from the service providing server 6A which is a transmission destination of the HTTP request, and transmits the received HTTP response to the client apparatus 2 which is a transmission source of the HTTP request along with a session ID for identifying the service providing server 6A (refer to S1306 and S1310 of FIG. 15, and S1704 of FIG. 19). However, when a session ID is received from the service providing server 6A which is a transmission destination of the HTTP request along with the HTTP response, the transmission unit 18A transmits the HTTP response to the client apparatus 2 which is a transmission source of the HTTP request along with the session ID received together therewith (refer to FIGS. 17, and S1306 of FIG. 20).

In addition, in Embodiment 2, for example, the session management system 1A may include plural session management servers 4A. In this case, the client apparatus 2 may transmit an HTTP request to any one of the session management servers 4A.

Embodiment 3

Figure 22:
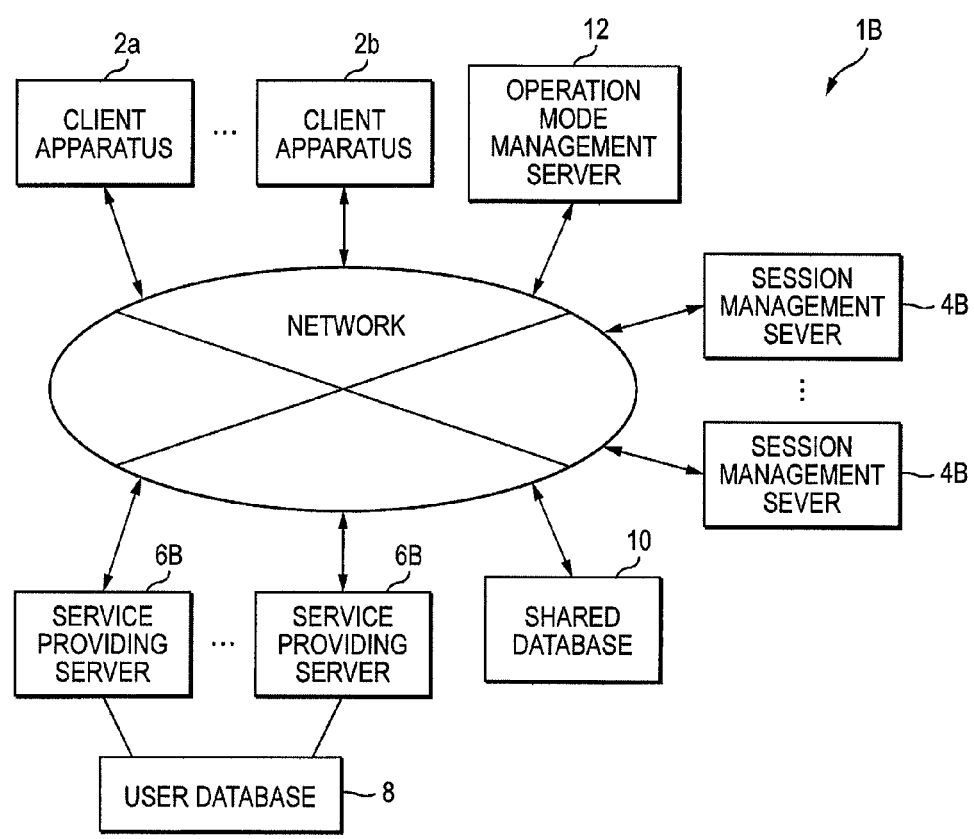
FIG. 22 is a diagram illustrating a configuration of a session management system according to Embodiment 3 of the present invention.

FIG. 22 is a diagram illustrating a configuration of a session management system 1B according to Embodiment 3 of the present invention. As illustrated in FIG. 22, the session management system 1B includes plural client apparatuses 2, at least one session management server 4B, plural service providing servers 6B which provide an information processing service, a shared database 10, and an operation mode management server 12. In Embodiment 3, plural session management servers 4B are provided. These apparatuses are connected to a network.

A browser application is installed in each of the client apparatuses 2, and a user logs in to an information processing service by using the browser application, so as to perform a HTTP session for using the information processing service. In Embodiment 3, a client apparatus 2*a* is realized by a personal computer which includes a microprocessor, a storage device such as a memory and a hard disk, an input device such as a mouse and a keyboard, a network interface, and a display. In addition, a client apparatus 2b is realized by an image processing system (a so-called multifunction machine) which includes a microprocessor, a storage device such as a memory and a hard disk, a network interface, a touch screen, and a scanner.

The session management server 4B, each of the service providing servers 6B, and the operation mode management server 12 are server computers which include a microprocessor, a storage device such as a memory and a hard disk, a network interface, and the like. The session management server 4B, the service providing server 6A, and the operation mode management server 12 respectively perform information processes according to programs stored in the storage devices. The programs may be received from the network so as to be stored in the storage devices, and may be read from a computer readable information storage medium so as to be stored in the storage devices.

Each session management server 4B transmits an HTTP request received from the client apparatus 2 to the service providing server 6B. In addition, an HTTP response received from the service providing server 6B is transmitted to the client apparatus 2. The session management server 4B is also referred to as a load balancer.

In addition, the service providing servers 6B provide a common information processing service to a user on a cloud, and provide an image processing service of translating a document image transmitted from the client apparatus 2, to the user in Embodiment 3. Each service providing server 6B is connected to a user database 8. The user database 8 stores authentication information (a user name (user identification information) and a password) of a user who is registered as a user of a service, and the service providing server 6B performs user authentication by using the user database 8.

The operation mode management server 12 controls an operation mode of the session management system 1B. The operation mode includes a first operation mode and a second operation mode, and the operation mode management server 12 switches an operation mode between the two operation modes. Specifically, the operation mode management server 12 monitors each session management server 4B and the service providing server 6B by using a server network management protocol (SNMP), and switches an operation mode according to a monitoring result. The session management servers 4B, the service providing servers 6B, and the operation mode management server 12 respectively store mode information indicating a current operation mode in the storage devices, and are operated in operation modes indicated by the mode information. In addition, monitoring items are registered in each of the session management servers 4B and service providing servers 6B which are SNMP agents, and a monitoring result regarding the monitoring items is returned in response to a request from the operation mode management server 12 which is an SNMP manager.

The first operation mode and the second operation mode will be described later.

The shared database 10 is a database shared by the respective service providing servers 6B, and stores context information described later in association with a session ID for identifying the service providing server 6B. Here, it is assumed that context information has not yet been stored in the shared database 10.

Figure 23:
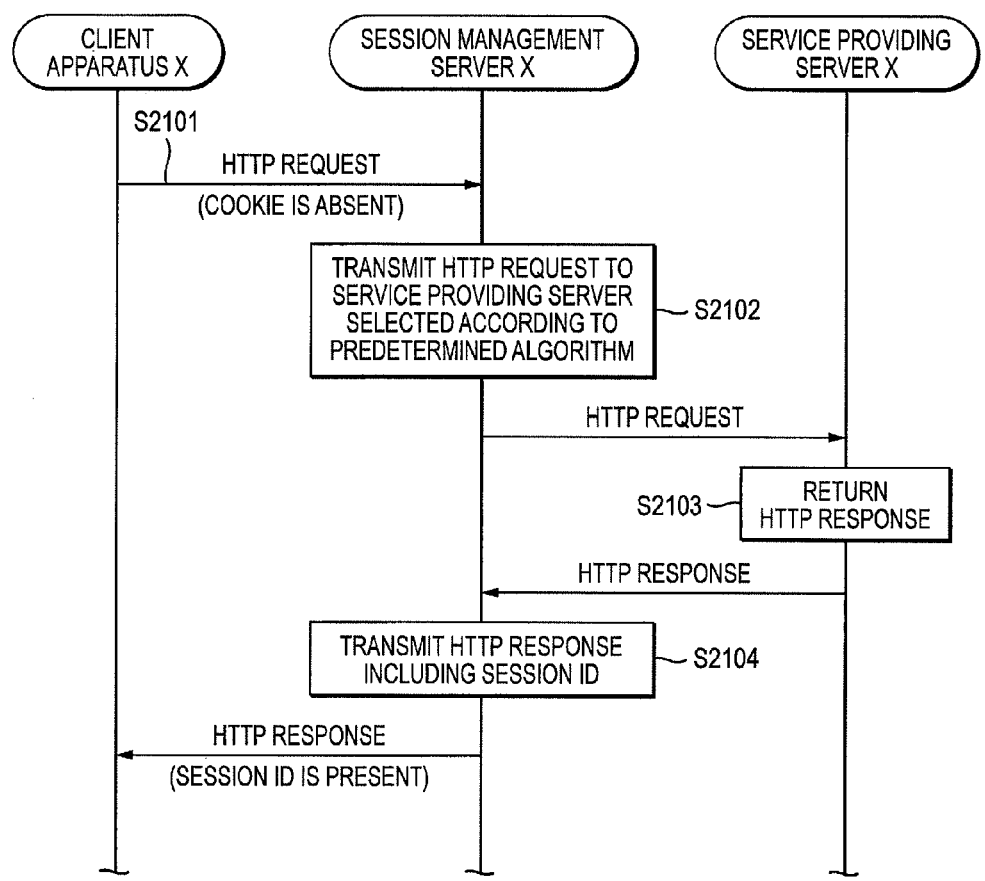
FIG. 23 is a sequence diagram illustrating a process performed in the session management system.

A description will be made of a case of using an image processing service. In Embodiment 3, a user activates a browser application in the client apparatus 2, and enters a uniform resource locator (URL) of a log-in screen at a predetermined location. FIG. 23 is a sequence diagram illustrating a process performed in the session management system 1B when the URL of the log-in screen is entered. Hereinafter, the client apparatus 2 in which the URL of the log-in screen is entered is referred to as a client apparatus X. When the user enters the URL of the log-in screen, the client apparatus X transmits an HTTP request (request data) to the session management server 4B by using the browser application (step S2101). Hereinafter, the session management server 4B which is a transmission destination of the HTTP request is referred to as a session management server X. The HTTP request includes various data items such as cookie information held in the storage device of the client apparatus X. Here, since the client apparatus X does not hold cookie information, the cookie information is not included in the HTTP request.

The session management server X receives the HTTP request transmitted from the client apparatus X. The received HTTP request is placed in a queue of the storage device. In addition, the session management server X dequeues and transmits the received HTTP response to any one of the service providing servers 6B. In a case where the HTTP request which does not include cookie information is received, the session management server 4B transmits the HTTP request to the service providing server 6 which is selected according to a predetermined algorithm (for example, a round-robin algorithm) in both of the first and second operation modes. Here, cookie information is not included in the HTTP request. For this reason, the session management server X transmits the received HTTP request to the service providing server 6B which is selected according to the predetermined algorithm (S2102). In addition, here, it is assumed that the HTTP request is transmitted to a service providing server X.

The service providing server X receives the HTTP request transmitted from the session management server X. The received HTTP request is placed in a queue of the storage device. In addition, the session management server X dequeues the received HTTP request, and returns an HTTP response corresponding to the HTTP request to the session management server 4B (S2103). In this step, the service providing server X returns a web page of the log-in screen as the HTTP response in both of the first operation mode and the second operation mode. In addition, the session management server X which has received the HTTP response transmits the received HTTP response to the client apparatus X along with a session ID for identifying the service providing server X which is a transmission source of the HTTP response (S2104). The session ID is included in the HTTP response as cookie information.

A log-in screen is displayed in the client apparatus X which has received the HTTP response. In addition, the cookie information in the HTTP response is preserved in the storage device. FIG. 24A is a diagram illustrating an example of the log-in screen. The user logs in to an image processing service by using the log-in screen. That is, the user enters authentication information (a user name and a password) of the user in the log-in screen. In addition, a predetermined button is pressed.

First Operation Mode

FIG. 25 is a sequence diagram illustrating a process performed in the session management system 1B when the user presses a predetermined button on the log-in screen. Here, a description will be made of a case where an operation mode is the first operation mode. First, the client apparatus X transmits an HTTP request including the cookie information stored in the storage device and the entered authentication information to the session management server X (S2201). When the HTTP request transmitted from the client apparatus X is received, the session management server X places the received HTTP request in a queue. In addition, the session management server X dequeues and transmits the received HTTP request to any one of the service providing servers 6B.

In the first operation mode, in a case where cookie information is included in the received HTTP request, the session management server 4B transmits the HTTP request to the service providing server 6B identified by a session ID in the cookie information. In this step, the cookie information is included in the HTTP request. For this reason, the session management server X transmits the HTTP request to the service providing server X identified by the session ID in the cookie information included in the HTTP request (S2202A).

When the HTTP request transmitted from the session management server X is received, the service providing server X places the received HTTP request in a queue. In addition, the service providing server X dequeues the received HTTP request.

In both of the first and second operation modes, in a case where authentication information is included in the received HTTP request, the service providing server 6B authenticates the user on the basis of the authentication information and storage content of the user database 8. In addition, if the user is authenticated, context information unique to the authenticated user is generated on the basis of the authentication information. For this reason, the service providing server X authenticates the user on the basis of authentication information in the dequeued HTTP request and storage content of the user database 8 (S2203). Specifically, the service providing server X determines whether or not the authentication information in the HTTP request is stored in the user database 8. In addition, if the user is authenticated, the service providing server X (a generation unit) generates context information unique to the authenticated user according to a predetermined context generation algorithm on the basis of the authentication information in the HTTP request (S2204). For example, the service providing server X encrypts a user name of the authenticated user so as to generate the context information. In addition, the context generation algorithm used to generate context information is used in common by all the service providing servers 6B.

In addition, when the context information is generated, the service providing server 6B returns an HTTP response corresponding to the received HTTP request to the session management server X as a redirect instruction along with the generated context information in both of the first and second operation modes. For this reason, the service providing server X returns an HTTP response to the session management server X as a redirect instruction along with the generated context information (S2205A). However, in the first operation mode, the service providing server 6B performs a first reply process illustrated in FIG. 26. Therefore, the service providing server X determines whether or not the same context information as the generated context information generated is stored in the shared database 10 (S2301). In addition, if the same context information as the generated context information is not included in the shared database 10 (N in step S2301), the service providing server X stores the generated context information in the shared database 10 in association with a session ID for identifying the service providing server X (S2302), and returns an HTTP response to the session management server X as a redirect instruction along with the generated context information (S2303).

On the other hand, if the same context information as the generated context information is included in the shared database 10 (Y in step S2301), the service providing server X returns the HTTP response to the session management server 4B along with not only the context information but also a session ID of the service providing server X associated with the context information (S2304). In addition, the context information and the session ID are included in the HTTP response as cookie information.

In this step, as described above, no context information has yet been stored in the shared database (N in step S2301). For this reason, in step S2205A, the service providing server X returns the HTTP response to the session management server X along with the context information.

When the HTTP response is received, the session management server X transmits the received HTTP response to the client apparatus X along with the session ID (S2206A). In other words, in the first operation mode, the session management server 4B performs a response transmission process illustrated in FIG. 27B when the HTTP response is received. For this reason, the session management server X determines whether or not a session ID is included in cookie information which is included in the HTTP response (S2401). In addition, if a session ID is not included in cookie information which is included in the HTTP response (N in step S2401), the session management server X returns the HTTP response to the client apparatus X along with a session ID of the service providing server X which is a transmission source of the HTTP response (S2402). On the other hand, if a session ID is included in cookie information which is included in the HTTP response (Y in step S2401), the session management server X returns the HTTP response to the client apparatus X as it is (S2403).

In this step, a session ID is not included in cookie information of the HTTP response. For this reason, in step S2206A, the session management server X returns the HTTP response to the client apparatus X along with a session ID of the service providing server X. In addition, the session ID is included in the HTTP response as cookie information.

The client apparatus X having received the HTTP response preserves the cookie information in the HTTP response in the storage device. In addition, an HTTP request including the cookie information is transmitted to the session management server X (S2207). The cookie information includes the session ID of the service providing server X and the context information.

When the HTTP request transmitted from the client apparatus X is received, the session management server X places the received HTTP request in a queue. In addition, the session management server X dequeues the received HTTP request. As described above, in the first operation mode, in a case where cookie information is included in the received HTTP request, the session management server 4B transmits the HTTP request to the service providing server 6B identified by a session ID in the cookie information. In this step, the cookie information is included in the HTTP request. For this reason, the session management server X transmits the HTTP request to the service providing server X identified by the session ID in the cookie information which is included in the HTTP request (S2208A).

When the HTTP request transmitted from the session management server X is received, the service providing server X places the received HTTP request in a queue. In addition, the service providing server X dequeues the received HTTP request. When the HTTP request including the context information in the cookie information is received, the service providing server 6B performs a second reply process illustrated in FIG. 28 in both of the first and second operation modes. For this reason, the service providing server X performs the second reply process illustrated in FIG. 29 in step S2209. In Embodiment 3, a context management database (hereinafter, referred to as a context management DB) in which context information is associated with a session progress degree indicating a progress degree of a session is provided in the storage device of each service providing server 6B. The service providing server X determines whether or not the same context information as the context information in the cookie information is preserved in the context management DB (S2501). If the same context information as the context information in the cookie information is not stored in the context management DB (N in step S2501), the context information in the cookie information is stored in the context management DB in association with a session progress degree indicating a progress degree of a session in the current step (S2502). In addition, a predetermined HTTP response is transmitted to the session management server X along with the context information in the cookie information (S2503). Specifically, the service providing server X transmits a web page of a setting screen illustrated in FIG. 24B as the HTTP response. The context information is included in the HTTP response as cookie information.

On the other hand, if the same context information as the context information in the cookie information is stored in the context management DB (Y in step S2501), an HTTP response corresponding to a session progress degree associated with the same context information as the context information in the cookie information is transmitted to the session management server X along with the context information (S2504). In addition, the session progress degree associated with the same context information as the context information in the cookie information is updated. Further, the context information is included in the HTTP response as cookie information.

In this step, the same context information as the context information in the cookie information is not stored in the context management DB. Therefore, the context information in the cookie information is preserved in the context management DB in association with a session progress degree indicating a progress degree of a session in the current step (S2502), and a web page of the setting screen illustrated in FIG. 24B is transmitted to the service providing server X along with the context information in the cookie information as the HTTP response (S2503).

The session management server X receives the HTTP response. As described above, in the first operation mode, when an HTTP response is received, the session management server 4B performs the response transmission process illustrated in FIG. 27. For this reason, the session management server X performs the response transmission process in step S2210A. In this step, a session ID is not included in the cookie information of the HTTP response. Therefore, in step S2210A, the session management server X returns the HTTP response to the client apparatus X along with a session ID of the service providing server X. In addition, the session ID is included in the HTTP response as cookie information. As a result, a screen corresponding to the HTTP response is displayed in the client apparatus X having received the HTTP response. In this step, the setting screen illustrated in FIG. 24B is displayed. Further, the cookie information in the HTTP response is preserved in the storage device.

Figure 29:
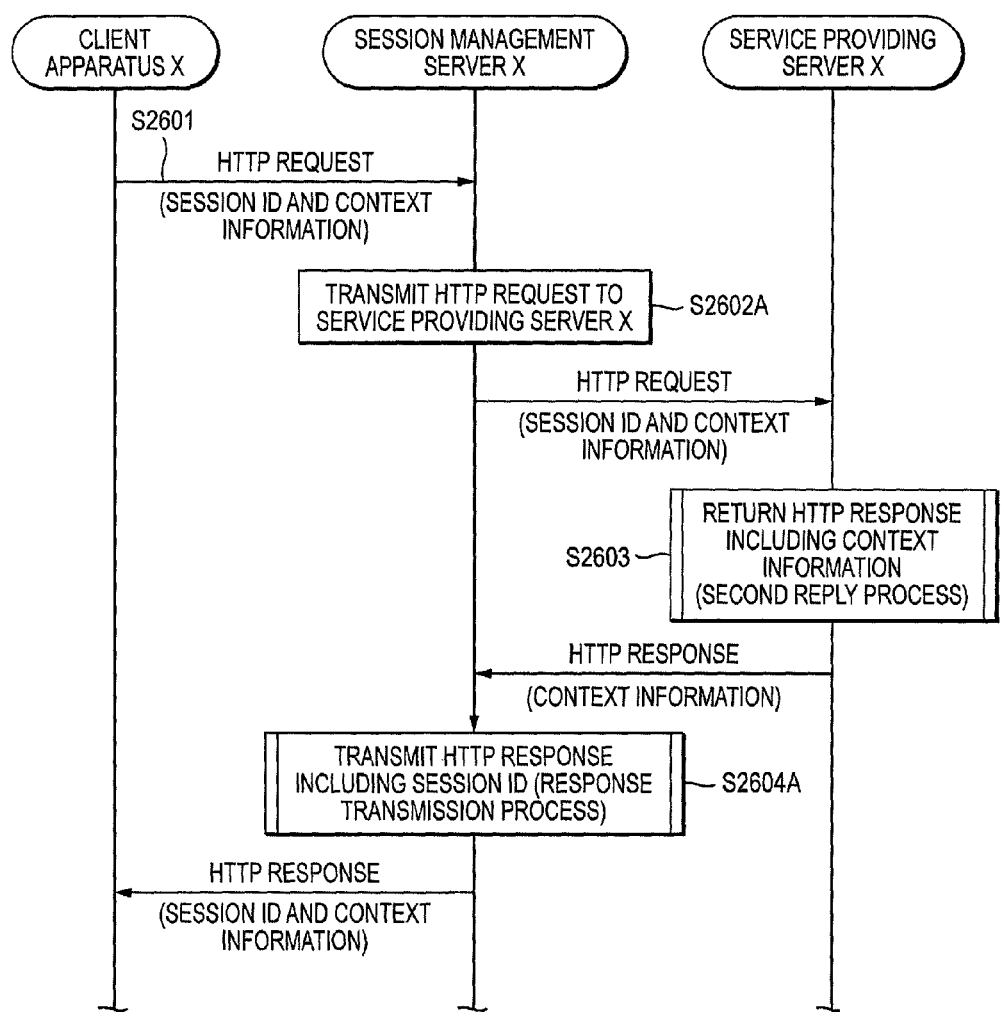
FIG. 29 is a sequence diagram illustrating a process performed in the session management system.

Then, the user executes an operation of performing a session with the service providing server X in the client apparatus X until a guide screen illustrated in FIG. 24C is displayed. Whenever an operation of performing a session is executed, a process illustrated in a sequence diagram of FIG. 29 is performed in the session management system 1B.

In other words, the client apparatus X transmits an HTTP request including cookie information stored in the storage device to the session management server X (S2601). The cookie information includes a session ID of the service providing server X and context information.

As described above, in the first operation mode, in a case where cookie information is included in a received HTTP request, the session management server 4B transmits the HTTP request to the service providing server 6B identified by a session ID in the cookie information. In this step, the cookie information is included in the HTTP request. For this reason, the session management server X transmits the HTTP request to the service providing server X identified by a session ID in cookie information which is included in the HTTP request (S2602A).

Figure 28:
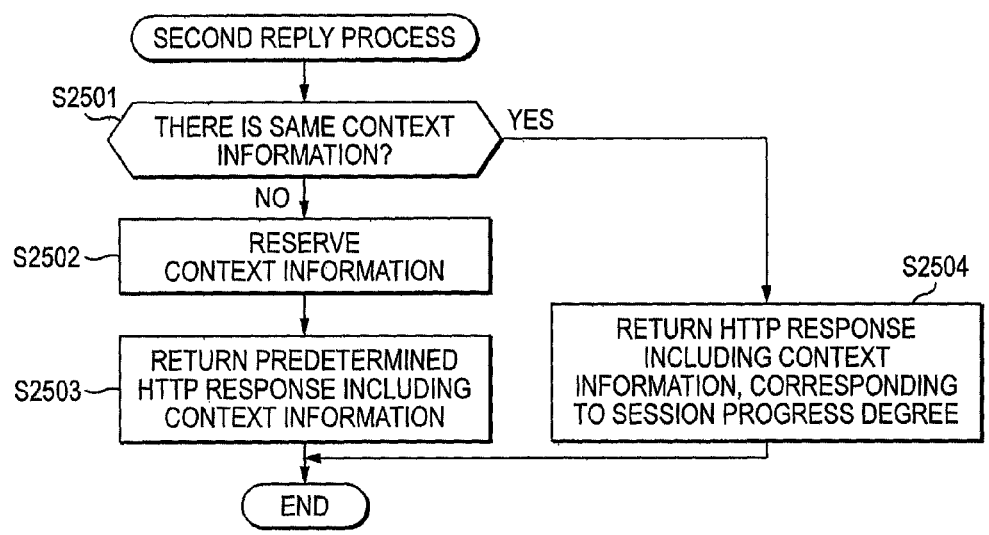
FIG. 28 is a flowchart illustrating a second reply process.

In addition, as described above, when the HTTP request including the context information in the cookie information is received, the service providing server 6B performs the second reply process illustrated in FIG. 28 in both of the first and second operation modes. For this reason, the service providing server X having received the HTTP request performs the second reply process illustrated (S2603). In this step, the same context information as the context information in the cookie information is stored in the context management DB. For this reason, the service providing server X returns an HTTP response corresponding to a session progress degree associated with the same context information as the context information in the cookie information to the session management server X along with the context information. In addition, the session progress degree associated with the same context information as the context information in the cookie information is updated.

Figure 27:
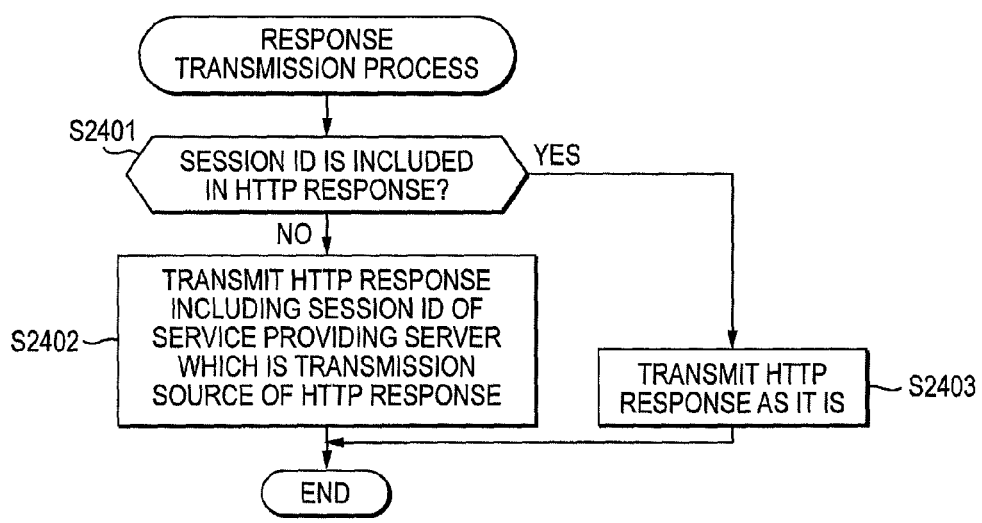
FIG. 27 is a flowchart illustrating a response transmission process.

In addition, as described above, in the first operation mode, when the HTTP response is received, the session management server 4B performs the response transmission process illustrated in FIG. 27. For this reason, the session management server X having received the HTTP response performs the response transmission process (S2604A). In this step, a session ID is not included in the cookie information of the HTTP response. Therefore, the session management server X returns the HTTP response to the client apparatus X along with a session ID of the service providing server X (S2402). In addition, the session ID is included in the HTTP response as cookie information. As a result, a screen corresponding to the HTTP response is displayed in the client apparatus X having received the HTTP response.

Here, a case is assumed in which the user first logs in to an image processing service in the client apparatus 2a so as to perform a session with the service providing server X in the client apparatus X until the guide screen illustrated in FIG. 24C is displayed, and then logs in again to the image processing service in the client apparatus 2b. In this case, an HTTP request which is initially transmitted from the client apparatus 2b may be transmitted to a service providing server Y different from the service providing server X in step S2102 of FIG. 23. However, for the following reason, even in this case, a session which has been performed with the service providing server X can be performed with the service providing server X again.

Figure 30:
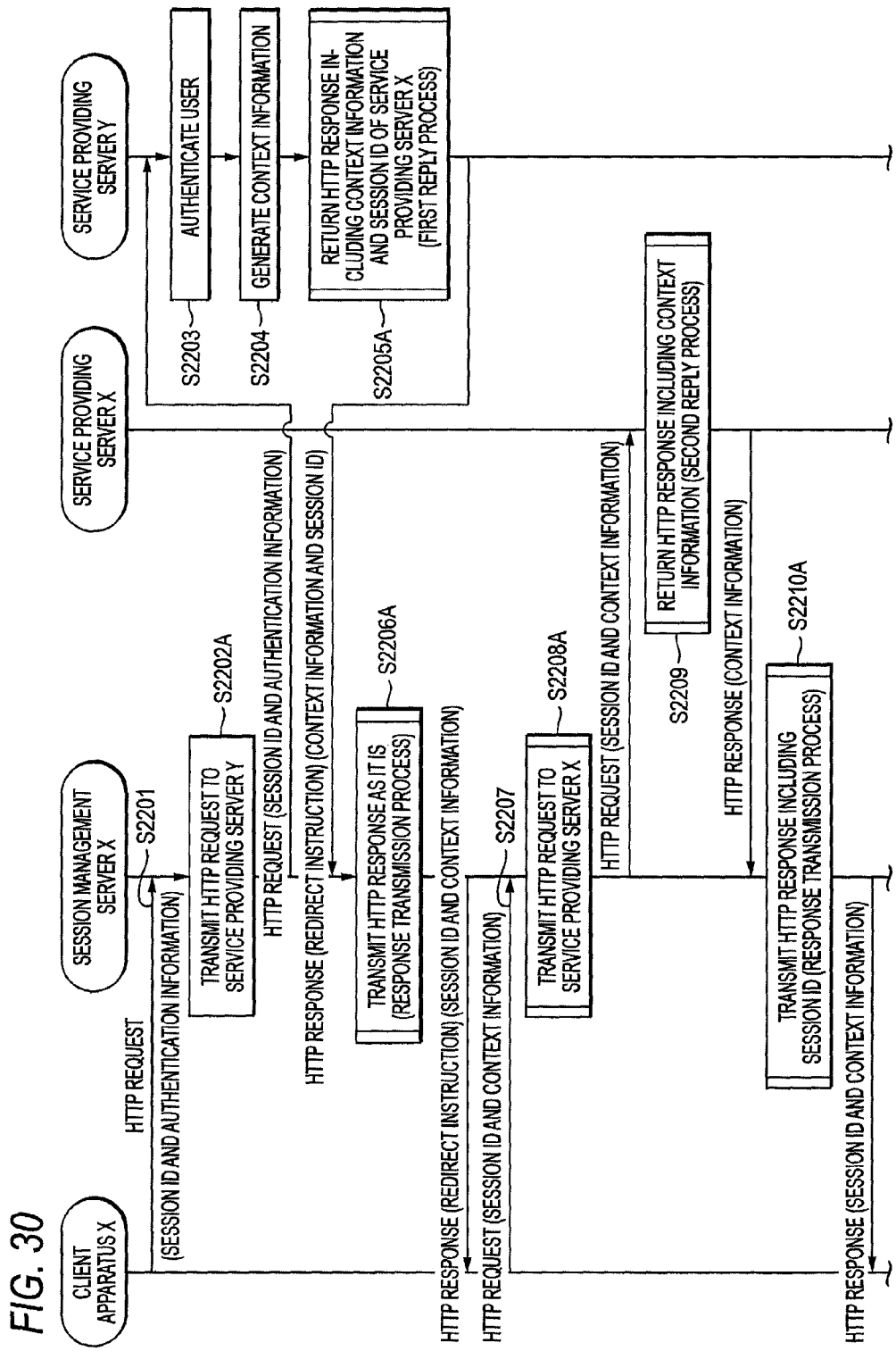
FIG. 30 is a sequence diagram illustrating a process performed in the session management system.

FIG. 30 is a sequence diagram illustrating a process performed in the session management system 1A when an HTTP request which is initially transmitted from the client apparatus 2b which is the client apparatus X is transmitted to the service providing server Y in the first operation mode. In this case, first, a session ID of the service providing server Y is included in cookie information of an HTTP request which is transmitted in step S2201. For this reason, the HTTP request is transmitted to the service providing server Y in step S2202A unlike in FIG. 23.

However, the same context information as the context information generated in step S2204 has been stored in the shared database 10. For this reason, step S2304 is performed in the first reply process (refer to FIG. 26) of S2205A, and thus the service providing server Y returns an HTTP response to the session management server X along with not only the context information but also a session ID of the service providing server X associated with the context information.

Further, in the response transmission process illustrated in FIG. 27, if the HTTP response including a session ID in the cookie information is received (Y in step S2401), the session management server 4B transmits the HTTP response to the client apparatus X as it is (S2403). For this reason, the session management server X having received the HTTP response in step S2206A transmits the received HTTP response to the client apparatus X. Therefore, in step S2206, not a session ID of the service providing server Y which is a transmission source of the HTTP but the session ID of the service providing server X is transmitted to the client apparatus X. Thus, in subsequent step S2207 or step S2601, the session ID of the service providing server X is included in HTTP requests transmitted from the client apparatus X, and, as a result, in subsequent step S2208A or step S2602A, HTTP requests are transmitted to the service providing server X at all times. Therefore, the user who logs in again to a service in the client apparatus 2b can perform the session which has been performed with the service providing server X by using the client apparatus 2a, with the service providing server X again. For this reason, for example, when the user logs in again, not the setting screen illustrated in FIG. 24B but an instruction standby screen of FIG. 24D which is to be displayed next to the guide screen of FIG. 24C is displayed. In addition, when an operation of performing a session is executed, a session with the service providing server X is performed as illustrated in the sequence diagram of FIG. 29.

Figure 26:
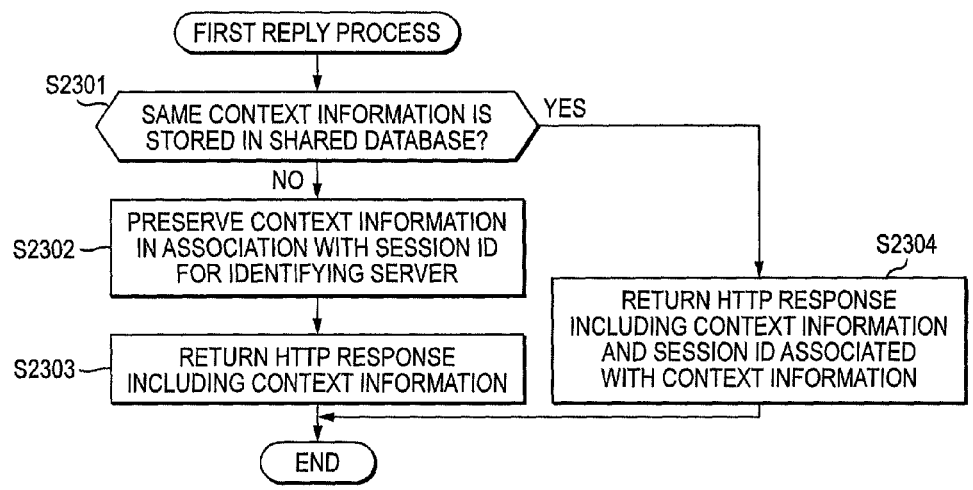
FIG. 26 is a flowchart illustrating a first reply process.

As mentioned above, in the first operation mode, context information is preserved in the shared database 10 in association with a session ID of the service providing server 6B which initially generates the context information (refer to S2302 of FIG. 26). In addition, when the service providing server 6B generates the context information, if the same context information as the generated context information has been stored in the shared database 10, a HTTP response is returned along with a session ID which is stored in association with the context information (refer to S2304 of FIG. 26). For this reason, the user who logs in to a service in the client apparatus 2b can perform the session which has been performed with the service providing server X by using the client apparatus 2a, with the service providing server X again.

Second Operation Mode

Also in the second operation mode, the user who logs in to a service in the client apparatus 2b can perform a session which has been performed with the service providing server X by using the client apparatus 2a, with the service providing server X again. However, a method is different from in the first operation mode. In other words, in the first operation mode, an operation of returning a transmission destination of an HTTP request from the service providing server Y to the service providing server X is mainly executed by the service providing server 6B, but, in the second operation mode, this operation is mainly executed by the session management server 4B.

Figure 31:
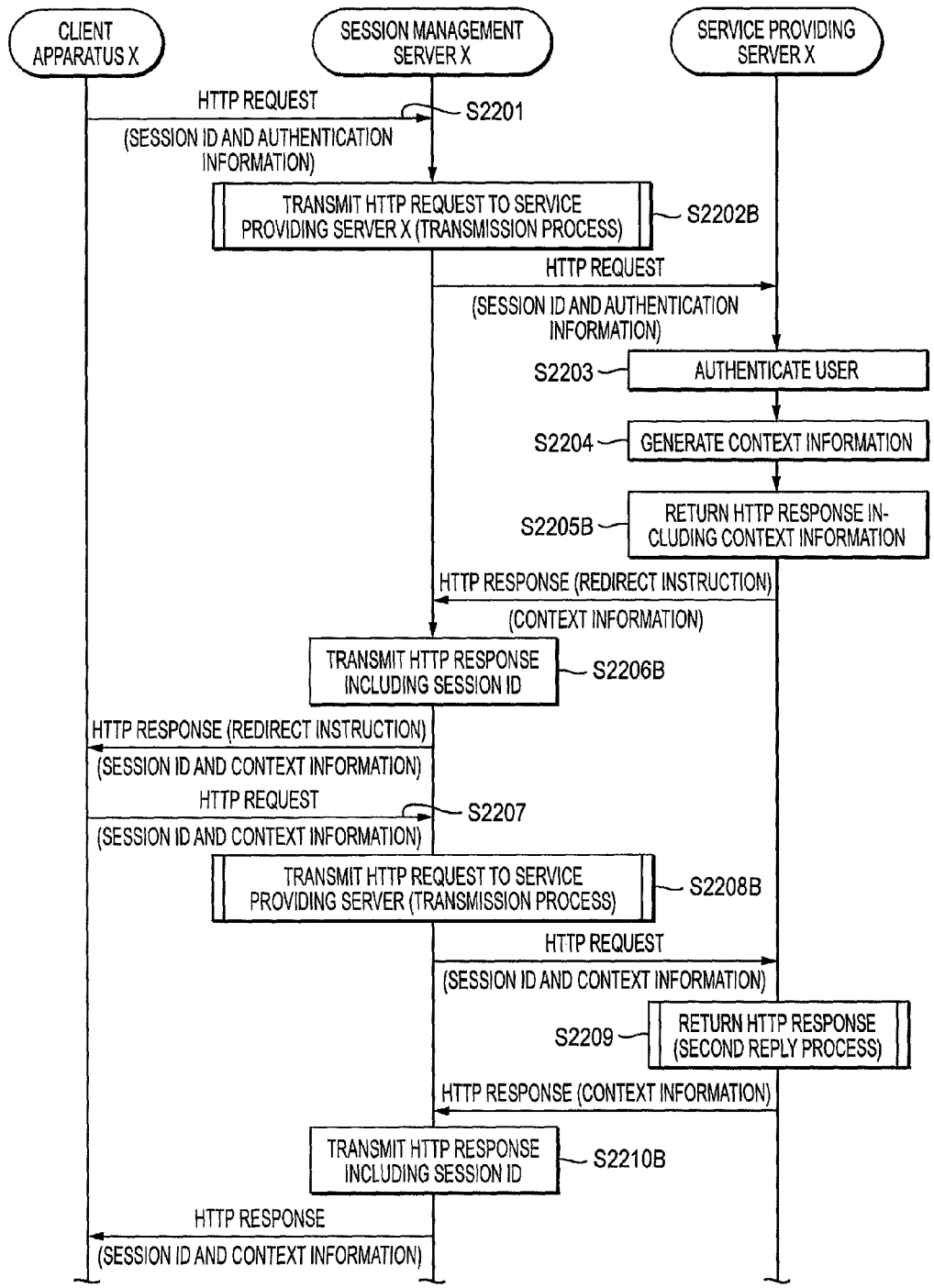
FIG. 31 is a sequence diagram illustrating a process performed in the session management system.
Figure 32:
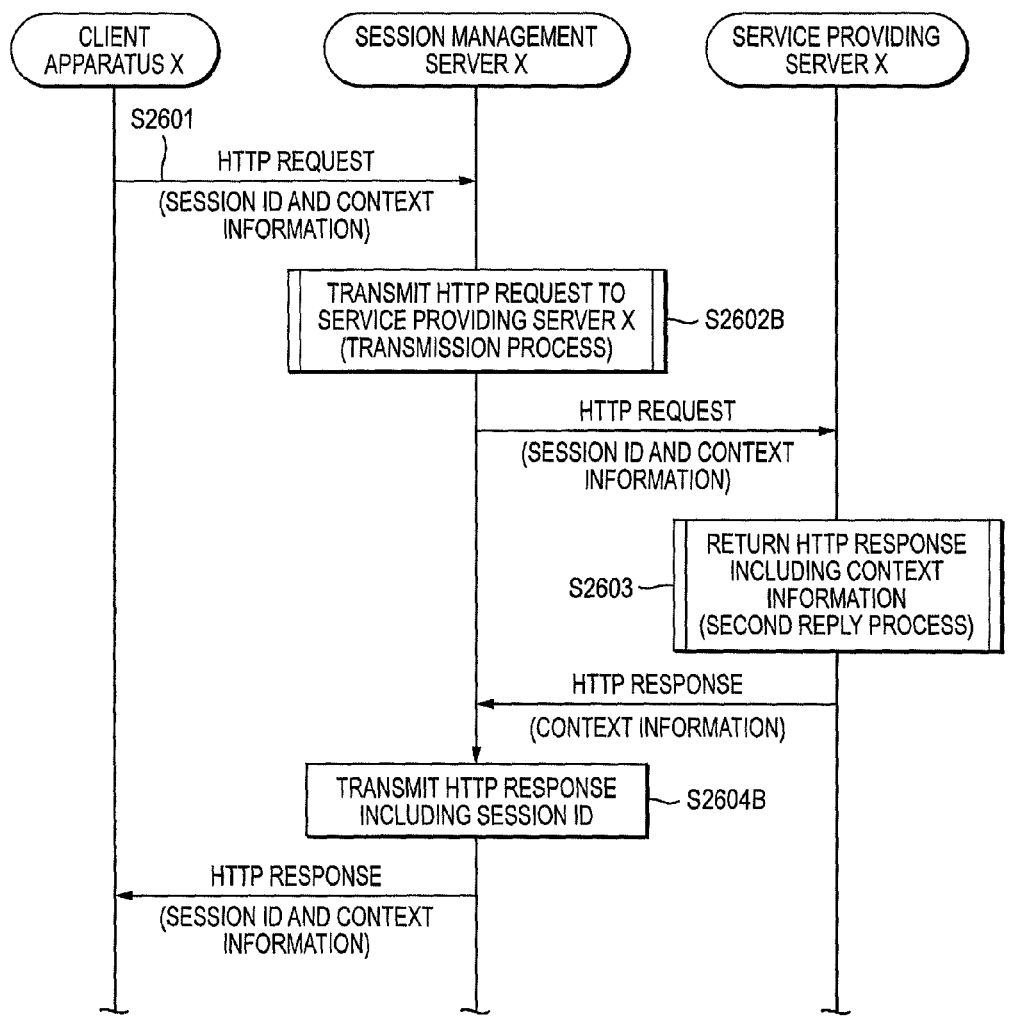
FIG. 32 is a sequence diagram illustrating a process performed in the session management system.

FIG. 31 is a sequence diagram illustrating a process performed in the session management system 1B when the user presses the predetermined button on the log-in screen in the second operation mode. FIG. 32 is a sequence diagram illustrating a process performed in the session management system 1B whenever an operation of performing a session is executed in the second operation mode.

In other words, in the second operation mode, when an HTTP request including authentication information is received, the service providing server 6B does not perform the first reply process illustrated in FIG. 26, but just returns an HTTP response to the session management server 4B which is a transmission source of the HTTP request as a redirect instruction along with context information generated from the authentication information. For this reason, step S2205B is performed instead of step S2205A, and, in step S2205B, the service providing server X just returns an HTTP response to the session management server X as a redirect instruction along with context information.

In addition, in the second operation mode, when the HTTP response is received, the session management server 4B does not perform the response transmission process illustrated in FIG. 27, but just transmits the HTTP response to the client apparatus 2 along with a session ID of the service providing server 6B which is a transmission source of the HTTP response. For this reason, steps S2206B, S2210B and S2604B are performed instead of steps S2206A, S2210A, and S2604A, and, in these steps, the session management server X transmits the HTTP response to the client apparatus X along with the session ID of the service providing server X.

Figure 33:
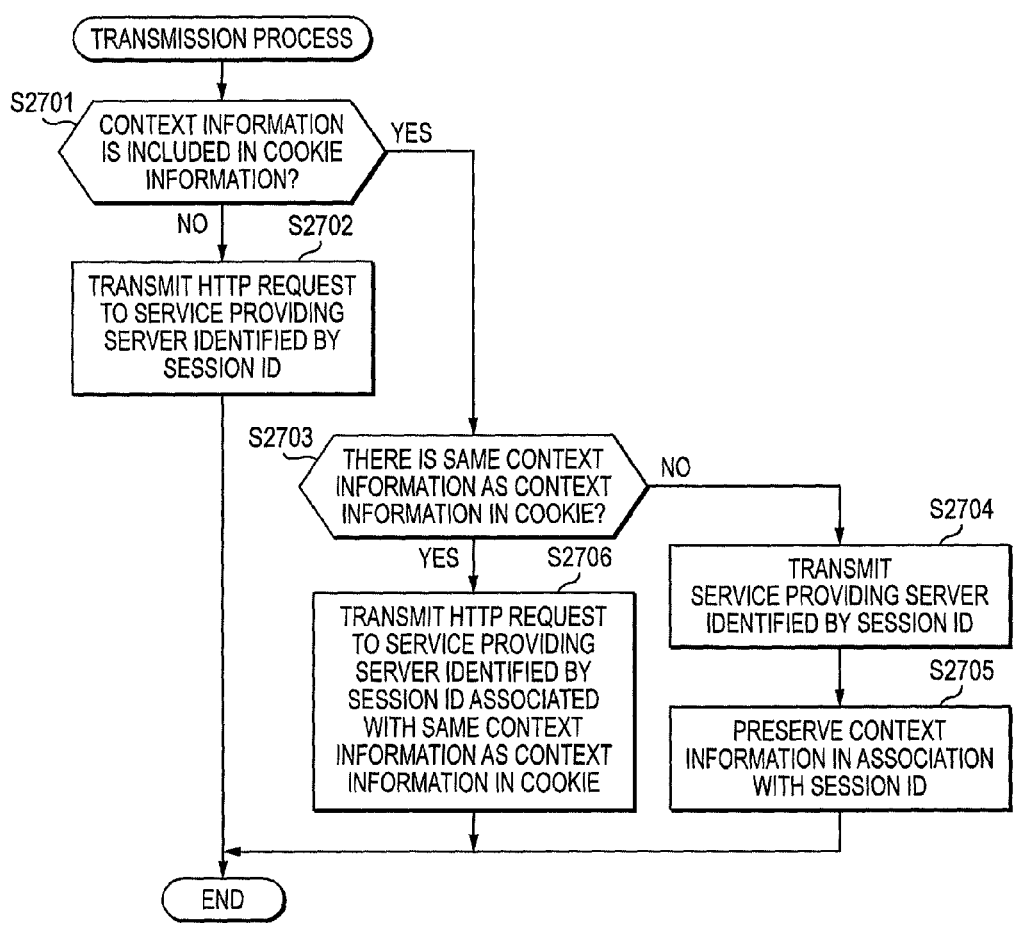
FIG. 33 is a flowchart illustrating a transmission process.

In addition, in the first operation mode, in a case where an HTTP request including a session ID in cookie information is received, the session management server 4B transmits the request to the service providing server 6B identified by the session ID in the cookie information, but, in the second operation mode, the session management server 4B performs a transmission process illustrated in FIG. 33. Therefore, steps S2202B, S2208B, and S2602B are performed instead of steps S2202A, S2208A, and S2602A, and, in these steps, a transmission process is performed.

FIG. 33 is a flowchart illustrating a transmission process. First, the session management server X determines whether or not context information is included in cookie information of the received HTTP request (S2701). If context information is not included in the cookie information (N in step S2701), the session management server X transmits the HTTP request to the service providing server 6B identified by a session ID in the cookie information (S2702). The cookie information of the HTTP request transmitted in step S2201 does not include context information and includes the session ID of the service providing server X. For this reason, in step S2202B, the HTTP request is transmitted to the service providing server X.

On the other hand, if context information is included in the cookie information (Y in step S2701), the session management server X determines whether or not the same context information as the context information in the cookie information is stored in the shared database 10 (S2703). In addition, if the same context information as the context information in the cookie information is not stored in the shared database 10 (N in S2703), the session management server X transmits the HTTP request to the service providing server 6B identified by a session ID in the cookie information in the same manner as in step S2702 (S2704), and preserves the context information and the session ID in the cookie information in the shared database 10 in association with each other (S2705). The cookie information of the HTTP request in step S2207 includes the context information and the session ID of the service providing server X. However, the same context information as this context information has not yet been stored in the shared database 10. For this reason, in step S2208B, the HTTP request is transmitted to the service providing server X.

On the other hand, if the same context information as the context information in the cookie information is stored in the shared database 10 (Y in step S2703), the session management server X transmits the HTTP request to the service providing server 6B identified by a session ID associated with the same context information as the context information in the cookie information (S2706). The cookie information of the HTTP request transmitted in step S2601 includes the session ID of the service providing server X. In addition, the same context information as the context information has been stored in the shared database 10 in association with the session ID of the service providing server X. For this reason, in step S2602B, the HTTP request is transmitted to the service providing server X.

Also in the second operation mode, when the user logs in again to a service, if an HTTP request is transmitted to the service providing server Y in step S2102, the HTTP request is transmitted to the service providing server Y in step S2202B. However, the context information included in the cookie information of the HTTP request transmitted in step S2207 or step S2601 has already been stored in the shared database 10 in association with the session ID of the service providing server X. For this reason, since the HTTP request is transmitted to the service providing server X in step S2208B or S2602B, a session which has been performed with the service providing server X by the user is performed with the service providing server X again.

As mentioned above, also in the second operation mode, context information is preserved in the shared database 10 in association with a session ID of the service providing server 6B which initially generates the context information (refer to S2705 of FIG. 33). In addition, in a case where an HTTP request including context information is received, if the same context information as the context information in the HTTP request has been stored in the shared database 10, the session management server 4B transmits the HTTP request to the service providing server 6B identified by a session ID associated with the context information (refer to S2706 of FIG. 33). For this reason, also in the second operation mode, the user who logs in again to a service in the client apparatus 2b can perform a session which has been performed with the service providing server X by using the client apparatus 2a, with the service providing server X again.

Operation Mode Management Server

Meanwhile, since the service providing server 6B is in a bottleneck state if processing efficiency of an HTTP request is low in the service providing server 6B, a request processing time (the time until an HTTP response is transmitted after an HTTP request is received) in the service providing server 6B is lengthened, and thus a response time is also lengthened. On the contrary, since the session management server 4B is in a bottleneck state if processing efficiency of an HTTP request is low in the session management server 4B, a request assignment time (the time until an HTTP request is transmitted to the service providing server 6 after the HTTP request is received) in the session management server 4B is lengthened, and thus a response time is also lengthened.

Therefore, in the session management system 1B, in a case where processing efficiency of an HTTP request in the service providing server 6B is lower than processing efficiency of an HTTP request in the session management server 4B, the operation mode management server 12 switches an operation mode from the first operation mode to the second operation mode so as to reduce a load on the service providing server 6B. In contrast, in a case where processing efficiency of an HTTP request in the session management server 4B is lower than processing efficiency of an HTTP request in the service providing server 6B, the operation mode management server 12 switches an operation mode from the second operation mode to the first operation mode so as to reduce a load on the session management server 4B. In the above-described manner, it is possible to prevent a response time from being lengthened. Hereinafter, description thereof will be made.

Figure 34:
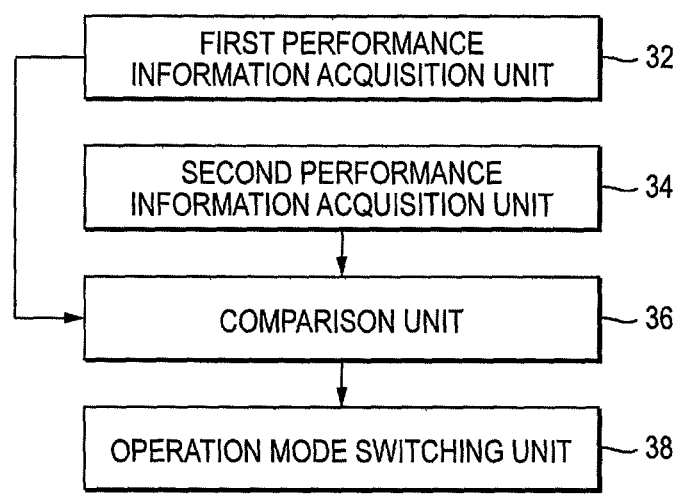
FIG. 34 is a functional block diagram illustrating a functional group realized in an operation mode management server.

FIG. 34 is a functional block diagram illustrating a functional group realized in the operation mode management server 12. As illustrated in FIG. 34, in the operation mode management server 12, a first performance information acquisition unit 32, a second performance information acquisition unit 34, a comparison unit 36, and an operation mode switching unit 38 are realized. These elements are realized by the microprocessor which is operated according to a program stored in the storage device.

The first performance information acquisition unit 32 acquires first performance information C1 indicating processing efficiency of an HTTP request in the service providing server 6B (refer to S2805 to S2808 of FIG. 35 described later). Here, the first performance information C1 is a load average for each service providing server 6B, a request processing time for each HTTP request received during a certain time period in the past, or the like. The load average is also referred to as a CPU usage ratio. In Embodiment 3, a load average or a request processing time for each HTTP request received during a time period in the past is registered as a monitoring item in each service providing server 6B, and the first performance information acquisition unit 32 acquires the first performance information C1 on the basis of a monitoring result received from each service providing server 6B. Here, the first performance information acquisition unit 32 acquires a request processing time for each HTTP request received during a certain time period in the past, as the first performance information C1, and the greater the value of the first performance information C1, the lower the processing efficiency. In addition, the first performance information C1 may be a variation in a request processing time for each HTTP request received during a certain time period in the past, a variance of a request processing time for each HTTP request received during a certain time period in the past, and the like.

The second performance information acquisition unit 34 acquires second performance information C2 indicating processing efficiency of an HTTP request in the session management server 4B (refer to S2801 to S2804 of FIG. 35 described later). The second performance information C2 is a load average for each session management server 4B, a request assignment time for each HTTP request received during a certain time period in the past, or the like. A load average or a request assignment time for each HTTP request received during a time period in the past is registered as a monitoring item in each session management server 4B, and the second performance information acquisition unit 34 acquires the second performance information C2 on the basis of a monitoring result received from each session management server 4B. Here, the second performance information acquisition unit 34 acquires a request assignment time for each HTTP request received during a certain time period in the past, as the second performance information C2, and the greater the value of the second performance information C2, the lower the processing efficiency. In addition, the second performance information C2 may be a variation in a request assignment time for each HTTP request received during a certain time period in the past, a variance of a request assignment time for each HTTP request received during a certain time period in the past, and the like.

The comparison unit 36 compares the first performance information C1 with the second performance information C2. In addition, the operation mode switching unit 38 switches an operation mode depending on a comparison result from the comparison unit 36. In Embodiment 3, when the request processing time for each request which is the first performance information C1 exceeds the request assignment time for each HTTP request which is the second performance information C2, it is considered that processing efficiency in the service providing server 6B is lower than that in the session management server 4B, and thus the service providing server 6B is in a bottleneck state. For this reason, in this case, the operation mode switching unit 38 switches an operation mode from the first operation mode to the second operation mode so as to reduce a load on the service providing server 6B. In the above-described manner, when the processing efficiency indicated by the first performance information C1 is lower than the processing efficiency indicated by the second performance information C2, an operation mode is switched from the first operation mode to the second operation mode.

On the other hand, when the first performance information C1 is equal to or less than the second performance information C2, it is considered that the processing efficiency in the session management server 4B is lower than that in the service providing server 6B, and thus the session management server 4B is in a bottleneck state. In this case, the operation mode switching unit 38 switches an operation mode from the second operation mode to the first operation mode so as to reduce a load on the session management server 4B. In the above-described manner, when the processing efficiency indicated by the second performance information C2 is equal to or higher than the processing efficiency indicated by the first performance information C1, an operation mode is switched from the second operation mode to the first operation mode.

Figure 35:
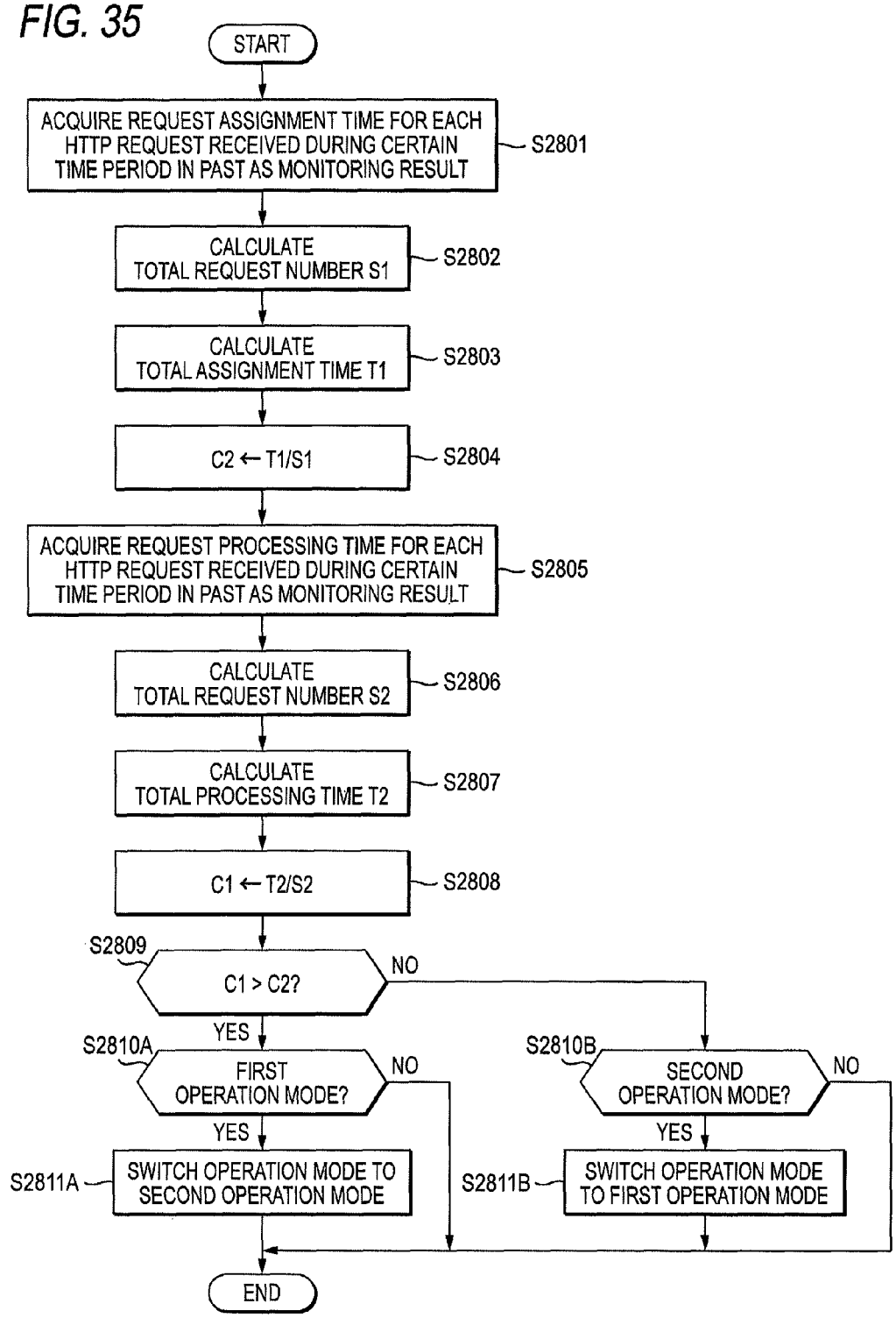
FIG. 35 is a flowchart illustrating a process performed in the operation mode management server.

FIG. 35 is a flowchart illustrating a process performed in the operation mode management server 12. The process illustrated in FIG. 35 is repeatedly performed at predetermined time intervals. First, the second performance information acquisition unit 34 sends a request to each session management server 4B, and receives a request assignment time for each HTTP request received during a certain time period in the past as a monitoring result from each session management server 4B (S2801). In addition, the second performance information acquisition unit 34 calculates a total number of HTTP requests received during a time period in the past as a total request number S1 in the whole of the session management server group included in the session management system 1B on the basis of the monitoring results (S2802). Further, the second performance information acquisition unit 34 calculates a sum total of HTTP request assignment times for respective HTTP requests received during a time period in the past as a total assignment time T1 in the whole of the session management server group included in the session management system 1B on the basis of the monitoring results (S2803). Furthermore, the second performance information acquisition unit 34 calculates the quotient (that is, a request assignment time for each HTTP request received during a time period in the past) obtained by dividing the total assignment time T1 by the total request number S1 as the second performance information C2 (S2804).

In addition, the first performance information acquisition unit 32 sends a request to each service providing server 6B, and receives a request processing time for each HTTP request received during a time period in the past as a monitoring result from each service providing server 6B (S2805). Further, the first performance information acquisition unit 32 calculates a total number of HTTP requests received during a time period in the past as a total request number S2 in the whole of the service providing server group included in the session management system 1B on the basis of the monitoring results (S2806). Furthermore, the first performance information acquisition unit 32 calculates a sum total of HTTP request processing times for respective HTTP requests received during a time period in the past as a total processing time T2 in the whole of the service providing server group included in the session management system 1B on the basis of the monitoring results (S2807). Moreover, the first performance information acquisition unit 32 calculates the quotient (that is, a request processing time for each HTTP request received during a time period in the past) obtained by dividing the total processing time T2 by the total request number S2 as the first performance information C1 (S2808).

When the first performance information C1 and the second performance information C2 are calculated in the above-described manner, the comparison unit 36 determines whether or not the first performance information C1 is more than the second performance information C2 (S2809). In step S2809, it is determined whether or not processing efficiency in the service providing server 6B is lower than that in the session management server 4B.

If the first performance information C1 is more than the second performance information C2 (Y in step S2809), the operation mode switching unit 38 performs a process described below. In other words, the operation mode switching unit 38 determines whether or not a current operation mode is the first operation mode on the basis of mode information stored in the storage device of the operation mode management server 12 (S2810A). In addition, if the current operation mode is the first operation mode (Y in step S2810A), the operation mode is switched to the second operation mode (S2811A). In other words, in step S2811A, the operation mode switching unit 38 updates the mode information stored in the storage device. In addition, a switching instruction for switching an operation mode is transmitted to each of the session management servers 4B and each of the service providing servers 6B. In each of the session management servers 4B and each of the service providing servers 6B having received the switching instruction, the mode information stored in the storage device is updated, and reception of an HTTP request is temporarily stopped. Further, if the current operation mode is the second operation mode (N in step S2810A), the process is finished.

On the other hand, if the first performance information C1 is equal to or less than the second performance information C2 (N in step S2809), the operation mode switching unit 38 performs a process described below. In other words, the operation mode switching unit 38 determines whether or not a current operation mode is the second operation mode on the basis of the mode information stored in the storage device of the operation mode management server 12 (S2810B). In addition, if the current operation mode is the second operation mode (Y in step S2810B), the operation mode is switched to the first operation mode (S2811B). In other words, in step S2811B, the operation mode switching unit 38 updates the mode information stored in the storage device. In addition, the above-described switching instruction is transmitted to each of the session management servers 4B and each of the service providing servers 6B. In each of the session management servers 4B and each of the service providing servers 6B having received the switching instruction, the mode information stored in the storage device is updated, and reception of an HTTP request is temporarily stopped. Further, if the current operation mode is the first operation mode (N in step S2810B), the process is finished.

As mentioned above, the operation mode management server 12 switches an operation mode from the first operation mode to the second operation mode when processing efficiency of an HTTP request in the service providing server 6B is lower than processing efficiency of an HTTP request in the session management server 4B, and switches an operation mode from the second operation mode to the first operation mode when processing efficiency of an HTTP request in the session management server 4B is lower than processing efficiency of an HTTP request in the service providing server 6B. For this reason, in the session management system 1B, a user who logs in again to a service in the client apparatus 2b cannot only perform the session which has been performed with the service providing server X by using the client apparatus 2a, with the service providing server X again, but a response time can also be prevented from being lengthened.

In addition, in Embodiment 3, the first performance information may be any information, for example, as long as the information indicates processing efficiency of an HTTP request in the service providing server 6B. The second performance information may be any information as long as the information indicates processing efficiency of an HTTP request in the session management server 4B.

In addition, the shared database 10 may be provided in the storage device of each session management server 4B. Further, in the second operation mode, the session management server 4B may access the shared database 10 provided in the storage device thereof when the transmission process illustrated in FIG. 33 is performed (for example, steps S2703, S2705, S2706, and the like). In this case, a database into which all the shared databases 10 are merged may be generated at a predetermined timing (for example, a timing in which an operation mode is switched), and all the shared databases 10 may be updated so as to be overwritten in the generated database.

In addition, the operation mode management server 12 may have an automatic scaling function. For example, in a case where processing efficiency in the service providing server 6B is lower than that in the session management server 4B, but a current operation mode is the second operation mode (N in step S2810A of FIG. 35), a service providing server 6B may be additionally provided in the session management system 1B. In addition, for example, in a case where processing efficiency in the session management server 4B is lower than that in the service providing server 6B, but a current operation mode is the first operation mode (N in step S2810B), a session management server 4B may be additionally provided in the session management system 1B.

In addition, each of the first performance information acquisition unit 32, the second performance information acquisition unit 34, the comparison unit 36, and the operation mode switching unit 38 may be realized in apparatuses (for example, the session management server 4B and the service providing server 6B) other than the operation mode management server 12. In other words, these functions may not be necessarily realized in the operation mode management server 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A session management system comprising:
a session management apparatus; and
a plurality of service providing apparatuses that provide the same kind of service,
wherein the session management apparatus includes:
a request reception unit that receives request data transmitted from a client apparatus;
a request transmission unit that transmits the request data received by the request reception unit, to a service providing apparatus which is specified by session information in the request data; and
a transmission unit that receives response data returned from the service providing apparatus which is a transmission destination of the request data after the request transmission unit transmits the request data, and that transmits the received response data to the client apparatus which is a transmission source of the request data along with session information for specifying the service providing apparatus which is a transmission destination,
wherein the service providing apparatus includes:
a reception unit that receives request data transmitted from the session management apparatus;
an authentication unit that authenticates a user identified by user identification information on the basis of the user identification information when the user identification information for identifying the user is included in the request data received by the reception unit; and
a response transmission unit that transmits response data corresponding to the request data received by the reception unit, to the session management apparatus, and
wherein, when user identification information for identifying a user is included in request data received by the reception unit, the response transmission unit transmits response data corresponding to the request data to the session management apparatus along with user information unique to the user who is authenticated by the authentication unit on the basis of the user identification information, the session management apparatus further includes a storage unit that stores user information in association with session information, the service providing apparatus further includes a second storage unit that stores the user information in association with a session progress degree, when user information is received from a service providing apparatus which is a transmission destination of request data along with response data after the request transmission unit transmits the request data, the transmission unit transmits the received response data to a client apparatus which is a transmission source of the request data along with session information for specifying the service providing apparatus which is a transmission destination and the received user information, in a case where, when user information is included in request data received by the request reception unit, and the same user information as the user information included in the request data is not stored in the storage unit, the request transmission unit stores the user information included in the request data in the storage unit in association with session information, and transmits the request data to a service providing apparatus specified by session information included in the request data, and in a case where, when user information is included in request data received by the request reception unit, and the same user information as the user information included in the request data is stored in the storage unit, the request transmission unit transmits the request data to a service providing apparatus specified by session information which is stored in the storage unit in association with the user information, and in a case where, when user information is included in request data received by the request reception unit, and the same user information as the user information included in the request data is stored in the second storage unit, the response transmission unit transmits the response data corresponding to the request data and the session progress degree in association with the user information stored in the second storage unit, to the session management apparatus.

2. The session management system according to claim 1, wherein the session management apparatus includes:

a unit that stores user information received by the transmission unit in the storage unit in association with session information for specifying a service providing apparatus which is a transmission destination when the transmission unit receives the user information which is not stored in the storage unit along with response data from the service providing apparatus which is a transmission destination of the request data after the request transmission unit transmits the request data.

3. A session management apparatus comprising:

a request reception unit that receives request data transmitted from a client apparatus;

a request transmission unit that transmits the request data received by the request reception unit, to a service providing apparatus which is specified by session information in the request data, among a plurality of service providing apparatuses which provide the same kind of service;

a transmission unit that receives response data returned from the service providing apparatus which is a transmission destination of the request data after the request transmission unit transmits the request data, and that transmits the received response data to the client apparatus which is a transmission source of the request data along with session information for specifying the service providing apparatus which is a transmission destination; and a storage unit that stores information, wherein, when user information unique to a user authenticated by a service providing apparatus which is a transmission destination is received from the service providing apparatus which is a transmission destination of request data along with response data after the request transmission unit transmits the request data, the transmission unit transmits the received response data to a client apparatus which is a transmission source of the request data along with session information for specifying the service providing apparatus which is a transmission destination and the received user information, in a case where user information is included in request data received by the request reception unit, and the same user information as the user information included in the request data is stored in the storage unit, the request transmission unit transmits the request data to a service providing apparatus specified by session information which is stored in the storage unit in association with the user information, and in a case where user information is included in request data received by the request reception unit from a client apparatus, from the service providing apparatus which is a transmission destination of the request data and which stores the same user information as the user information included in the request data in association with a session progress degree, the response data corresponding to the request data and the session progress degree corresponding to the user information is received, and the transmission unit transmits the received response data corresponding to the session progress degree.

4. A non-transitory computer readable medium storing a program causing a computer including a storage unit, to execute a process for a session management, the process comprising:

receiving request data transmitted from a client apparatus;

transmitting the received request data received, to a service providing apparatus which is specified by session information in the request data, among a plurality of service providing apparatuses which provide the same kind of service;

receiving response data returned from the service providing apparatus which is a transmission destination of the request data after transmitting the request data, transmitting the received response data to the client apparatus which is a transmission source of the request data along with session information for specifying the service providing apparatus which is a transmission destination;

when user information unique to a user authenticated by a service providing apparatus which is a transmission destination is received from the service providing apparatus which is a transmission destination of request data along with response data after transmitting the request data, transmitting the received response data to a client apparatus which is a transmission source of the request data along with session information for specifying the service providing apparatus which is a transmission destination and the received user information;

in a case where, when user information is included in received request data, and the same user information as the user information included in the request data is not stored in the storage unit, storing the user information included in the request data in the storage unit in association with session information, and transmitting the request data to a service providing apparatus specified by session information included in the request data;

in a case where, when user information is included in received request data, and the same user information as the user information included in the request data is stored in the storage unit, transmitting the request data to a service providing apparatus specified by session information which is stored in the storage unit in association with the user information; and in a case where, when user information is included in received request data, and, from the service providing apparatus which is a transmission destination of the request data and which stores the same user information as the user information included in the received request data in association with a session progress degree, the response data corresponding to the request data and the session progress degree corresponding to the user information is received, transmitting the received response data corresponding to the session progress degree to the client apparatus.

\* \* \* \* \*